United States Patent
Kras et al.

(10) Patent No.: US 11,356,480 B2
(45) Date of Patent: Jun. 7, 2022

(54) SYSTEMS AND METHODS OF SIMULATED PHISHING CAMPAIGN CONTEXTUALIZATION

(71) Applicant: KnowBe4, Inc., Clearwater, FL (US)

(72) Inventors: Greg Kras, Dunedin, FL (US); Katie Brennan, Clearwater, FL (US)

(73) Assignee: KnowBe4, Inc., Clearwater, FL (US)

( * ) Notice: Subject to any disclaimer, the term of this patent is extended or adjusted under 35 U.S.C. 154(b) by 0 days.

(21) Appl. No.: 17/390,515

(22) Filed: Jul. 30, 2021

(65) Prior Publication Data
US 2022/0070214 A1    Mar. 3, 2022

Related U.S. Application Data

(60) Provisional application No. 63/070,386, filed on Aug. 26, 2020.

(51) Int. Cl.
*H04L 9/40*    (2022.01)
*G06N 20/00*    (2019.01)

(52) U.S. Cl.
CPC ......... *H04L 63/1483* (2013.01); *G06N 20/00* (2019.01); *H04L 63/1433* (2013.01)

(58) Field of Classification Search
CPC .. H04L 63/1483; H04L 63/1433; G06N 20/00
See application file for complete search history.

(56) References Cited

U.S. PATENT DOCUMENTS

| | | |
|---|---|---|
| 8,615,807 B1 | 12/2013 | Higbee et al. |
| 8,635,703 B1 | 1/2014 | Belani et al. |
| 8,719,940 B1 | 5/2014 | Higbee et al. |
| 8,910,287 B1 | 12/2014 | Belani et al. |
| 8,966,637 B2 | 2/2015 | Belani et al. |
| 9,053,326 B2 | 6/2015 | Higbee et al. |
| 9,246,936 B1 | 1/2016 | Belani et al. |
| 9,253,207 B2 | 2/2016 | Higbee et al. |
| 9,262,629 B2 | 2/2016 | Belani et al. |
| 9,325,730 B2 | 4/2016 | Higbee et al. |
| 9,356,948 B2 | 5/2016 | Higbee et al. |
| 9,398,038 B2 | 7/2016 | Higbee et al. |
| 9,591,017 B1 | 3/2017 | Higbee et al. |
| 9,667,645 B1 | 5/2017 | Belani et al. |

(Continued)

FOREIGN PATENT DOCUMENTS

WO    WO-2016/164844 A1    10/2016
WO    WO-2019172946 A1 *   9/2019 ......... G06F 16/3329

*Primary Examiner* — Sarah Su
(74) *Attorney, Agent, or Firm* — Foley & Lardner LLP

(57) ABSTRACT

Systems and methods are described for contextualizing a simulated phishing communication based at least on one of language and locale. Initially, a template for a simulated phishing communication is created with content in a source language. Then one or more contextual parameters for a user are identified. The one or more contextual parameters identify at least one of a target language and a target locale. The content of the simulated phishing communication is modified according to at least one of the target language and the target locale and the simulated phishing communication is communicated to one or more devices of the user with the content modified for at least one of the target language and the target locale.

26 Claims, 11 Drawing Sheets

(56) References Cited

U.S. PATENT DOCUMENTS

| | | | |
|---|---|---|---|
| 9,749,360 B1* | 8/2017 | Irimie | H04L 51/32 |
| 9,825,984 B1* | 11/2017 | Hoover | H04L 63/1441 |
| 9,825,995 B1* | 11/2017 | Schroeder | H04L 63/205 |
| 9,876,753 B1 | 1/2018 | Hawthorn | |
| 9,912,687 B1 | 3/2018 | Wescoe et al. | |
| 10,243,904 B1 | 3/2019 | Wescoe et al. | |
| 10,904,186 B1 | 1/2021 | Everton et al. | |
| 10,917,429 B1* | 2/2021 | Patton | H04L 63/1433 |
| 10,986,122 B2 | 4/2021 | Bloxham et al. | |
| 11,044,267 B2 | 6/2021 | Jakobsson et al. | |
| 2016/0164898 A1 | 6/2016 | Belani et al. | |
| 2016/0301705 A1 | 10/2016 | Higbee et al. | |
| 2016/0308897 A1* | 10/2016 | Chapman | H04L 63/1483 |
| 2017/0103674 A1* | 4/2017 | Sadeh-Koniecpol | H04L 63/1433 |
| 2017/0244746 A1* | 8/2017 | Hawthorn | G06F 21/55 |
| 2019/0173819 A1 | 6/2019 | Wescoe et al. | |
| 2019/0215335 A1 | 7/2019 | Benishti | |
| 2019/0245885 A1 | 8/2019 | Starink et al. | |
| 2019/0245894 A1* | 8/2019 | Epple | H04L 63/1425 |
| 2020/0021606 A1* | 1/2020 | Cardinal | H04L 63/08 |
| 2020/0233571 A1* | 7/2020 | Yuravlivker | G06F 3/04847 |
| 2020/0396253 A1* | 12/2020 | Irimie | H04L 51/18 |
| 2021/0075827 A1 | 3/2021 | Grealish | |
| 2021/0160281 A1* | 5/2021 | Hallaji | H04L 63/08 |
| 2021/0185075 A1 | 6/2021 | Adams | |
| 2021/0194924 A1* | 6/2021 | Heinemeyer | G06F 21/577 |
| 2021/0312400 A1* | 10/2021 | Irimie | H04L 63/1416 |
| 2021/0344713 A1* | 11/2021 | Kras | G06F 21/552 |

* cited by examiner

← ↓ ↻ 🔒 https://www.theweek.com/107044/US-coronavirus-timeline — 602

News  Sport  Business  Technology  Cars  Portfolio  Podcast  Bookshop  Subscriptions  🔍 Search Coronavirus timeline: how the pandemic unfolded in the US
Locking down earlier could have saved 20,000 US lives', says former government adviser August 04, 2020

More people died as a result of the Covid-19 pandemic in the US than in any other country, according to new research.

The Office for National Statistics says the US had the longest period of above-average daily deaths, and therefore the greatest number of excess deaths.

The total number of confirmed deaths in hospitals, care homes and the wider community during the pandemic now stands at 46,201, while the total number of confirmed cases in the US is 304,695.

604 —

MERRILL EDGE® SELF-DIRECTED
Become a more informed investor.

Get up to $ 600
When you invest in a new account.

MERRILL 🐂
A BANK OF AMERICA COMPANY

Get Started

FIG. 6

SYSTEMS AND METHODS OF SIMULATED PHISHING CAMPAIGN CONTEXTUALIZATION

RELATED APPLICATIONS

This patent application claims the benefit of and priority to U.S. Provisional Patent Application No. 63/070,386 titled "SYSTEMS AND METHODS OF SIMULATED PHISHING ATTACK CONTEXTUALIZED," and filed Aug. 26, 2020, the contents of all of which are hereby incorporated herein by reference in its entirety for all purposes

TECHNICAL FIELD

The present invention generally relates to systems and methods for contextualizing a simulated phishing campaign through modification or replacement of the content to make the simulated phishing campaign more relevant and more appropriate to an individual user.

BACKGROUND

Cybersecurity incidents such as phishing attacks may cost organizations in terms of the loss of confidential and/or important information, and expense in mitigating losses due to breach of confidential information. Such incidents can also cause customers to lose trust in the organizations. The incidents of cybersecurity attacks and the costs of mitigating the damage caused are increasing every year. Organizations invest in cybersecurity tools such as antivirus, anti-ransomware, anti-phishing and other platforms. Such cybersecurity tools may detect and intercept known cybersecurity attacks. However, social engineering attacks or new threats may not be readily detectable by such tools, and the organizations may have to rely on their employees to recognize such threats. Among the cybersecurity attacks, organizations have recognized phishing attacks as one of the most prominent threats that can cause serious breaches of data including confidential information such as intellectual property, financial information, organizational information and other important information. Attackers who launch phishing attacks may attempt to evade an organization's security apparatuses and tools, and target its employees. To prevent or to reduce the success rate of phishing attacks on employees, the organizations may conduct security awareness training programs for their employees, along with other security measures. Through security awareness training programs, the organizations actively educate their employees on how to spot and report a suspected phishing attack. As a part of a security awareness training program, an organization may execute a simulated phishing campaign for its employees, to test and develop cybersecurity awareness of the employees. In an example, the organization may execute the simulated phishing campaign by sending out one or more simulated phishing communications periodically or occasionally to devices of employees and observe responses of employees to such simulated phishing communications. A simulated phishing communication may mimic a real phishing communication and appear genuine to entice an employee to respond/interact with the simulated phishing communication. The simulated phishing communication may serve the purpose of training an employee to recognize phishing attacks and to gauge the security awareness of the employee based on an interaction of the employee with the simulated phishing communication (for example, by clicking on a link in the simulated phishing communication or opening an attachment in the simulated phishing communication) for further security awareness training.

Organizations may have a global presence as communication and technology developments continue to increase international business. Accordingly, employees of organizations may be based in different cities, countries, and even continents. The employees may speak different languages and have backgrounds based out of different cultures. In such scenarios, a simulated phishing campaign with a standard simulated phishing communication may not appear relevant to many of the employees located worldwide. For a simulated phishing communication to be more successful or for a simulated phishing campaign to be relevant to each employee or a set of employees of an organization, individual simulated phishing campaigns customized to the employee or the set of employees may have to be created. Realistic and relevant simulated phishing attack content may increase the likelihood of the employee interacting with the simulated phishing attack content and thus fulfill the purpose of educating the employee in identifying phishing attacks. Creating different variations of the simulated phishing campaigns customized for each employee or a set of employees may be time consuming and inefficient.

SUMMARY

The present invention generally relates to systems and methods for contextualizing a simulated phishing campaign through modification or replacement of the content to make the simulated phishing campaign more relevant and more appropriate to an individual user.

Systems and methods are provided for contextualizing a simulated phishing communication based at least on one of a language and locale. In an example embodiment, a method for contextualizing a simulated phishing communication based at least on one of a language and locale is described, which includes creating a template for a simulated phishing communication with content in a source language, identifying one or more contextual parameters that identify at least one of a target language and a target locale for one or more users, modifying content from the template according to at least the target language and the target locale to use in the simulated phishing communication, and communicating the modified simulated phishing communication to one or more users.

In some implementations, the method further includes identifying one or more contextual parameters of a second user where the one or more contextual parameters identify a second target language and/or a second target locale and modifying the content of the simulated phishing communication for the second target language and/or the second target locale.

In some implementations, the one or more contextual parameters identify one or more of the following; a job title, job department, religious belief, topic of communication, subject of communication, industry, address, name or nickname of user, and regional currency and units.

In some implementations, the method includes translating the content of the simulated phishing communication from the source language to the target language.

In some implementations, the method includes changing the content of the simulated phishing communication to appear to be from an entity of the target locale instead of an entity of a source locale.

In some implementations, the method includes modifying a source image in the content of the simulated phishing communication to a target image of the target locale.

In some implementations, the method includes modifying location related content in the content of the simulated phishing communication to include location related content for the target locale.

In some implementations, the method includes modifying tagged content in the content of the simulated phishing communication to be for one of the target locale or the target language.

In some implementations, the method includes receiving an input from the user on the user's preference for one of the target language and the target locale.

In some implementations, the method includes detecting an interaction with the simulated phishing communication by the user.

In some implementations, the method includes identifying electronic training for the user based on the detection of the interaction with the simulated phishing communication by the user.

In some implementations, the method includes modifying content of the electronic training according to one of the target language and the target locale, and communicating the electronic training to the user.

In another example implementation, a system for contextualizing a simulated phishing communication based at least on one of language and locale is described. The system creates a template for a simulated phishing communication with content in a source language and identifies one or more contextual parameters for a user. The one or more contextual parameters identify at least one of a target language and a target locale. The system further modifies the content of the template according to at least one of the target language and the target locale to use in the simulated phishing communication and communicates the simulated phishing communication with the content modified for at least the target language and the target locale to the user.

Other aspects and advantages of the invention will become apparent from the following detailed description, taken in conjunction with the accompanying drawings, which illustrate by way of example the principles of the invention.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 6 shows an illustration of a contextualized simulated phishing communication embedded in a webpage being viewed by a user, according to some embodiments;

DETAILED DESCRIPTION

For the purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods for contextualizing a simulated phishing campaign through modification or replacement of the simulated phishing campaign to make the simulated phishing campaign more relevant and appropriate to an individual user.

A. Computing and Network Environment

Figure 1A:
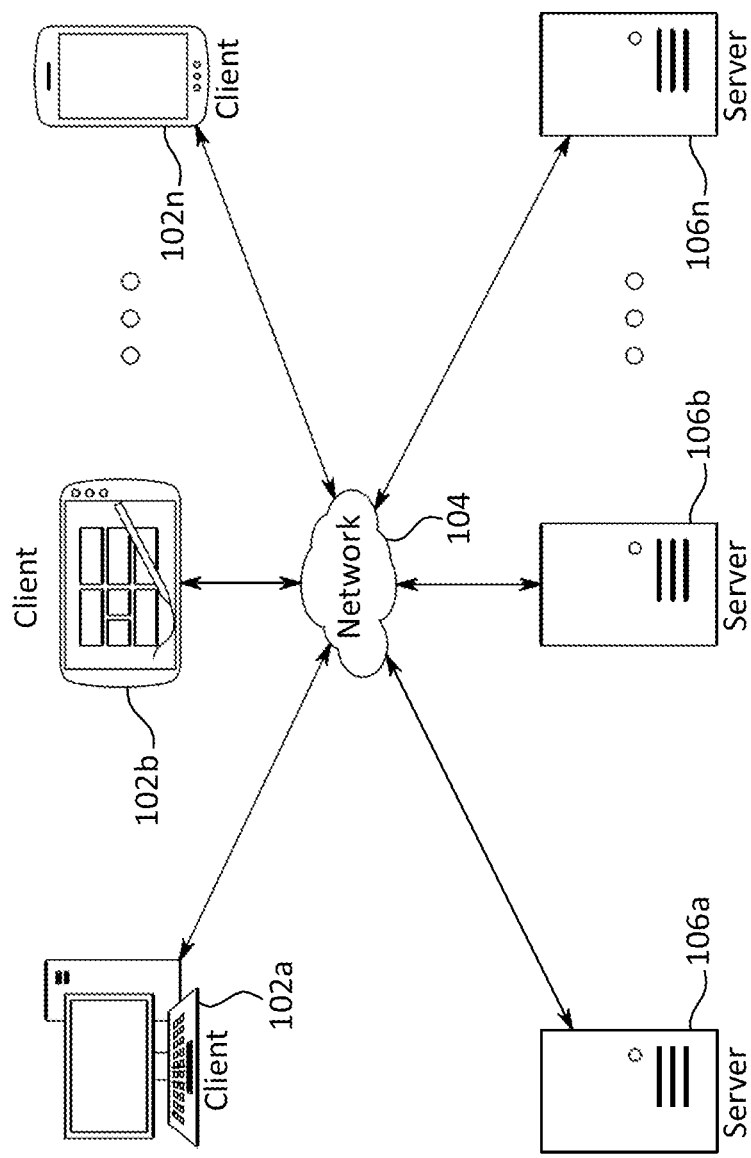
FIG. 1A is a block diagram depicting an embodiment of a network environment comprising client devices in communication with server devices, according to some embodiments.

Prior to discussing specific embodiments of the present solution, it may be helpful to describe aspects of the operating environment as well as associated system components (e.g. hardware elements) in connection with the methods and systems described herein. Referring to FIG. 1A, an embodiment of a network environment is depicted. In a brief overview, the network environment includes one or more clients 102*a*-102*n* (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106*a*-106*n* (also generally referred to as server(s) 106, node(s) 106, machine(s) 106, or remote machine(s) 106) via one or more networks 104. In some embodiments, client 102 has the capacity to function as both a client node seeking access to resources provided by a server and as a server providing access to hosted resources for other clients 102*a*-102*n*.

Although FIG. 1A shows a network 104 between clients 102 and the servers 106, clients 102 and servers 106 may be on the same network 104. In some embodiments, there are multiple networks 104 between clients 102 and servers 106. In one of these embodiments, network 104' (not shown) may be a private network and a network 104 may be a public network. In another of these embodiments, network 104 may be a private network and a network 104' may be a public network. In still another of these embodiments, networks 104 and 104' may both be private networks.

Network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

Network 104 may be any type and/or form of network. The geographical scope of the network may vary widely and network 104 can be a body area network (BAN), a personal area network (PAN), a local-area network (LAN), e.g. Intranet, a metropolitan area network (MAN), a wide area network (WAN), or the Internet. The topology of network 104 may be of any form and may include, e.g., any of the following: point-to-point, bus, star, ring, mesh, or tree. Network 104 may be an overlay network which is virtual and sits on top of one or more layers of other networks 104'. Network 104 may be of any such network topology as known to those ordinarily skilled in the art capable of supporting the operations described herein. Network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. Network 104 may be a type of broadcast network, a telecommunications network, a data communication network, or a computer network.

In some embodiments, the system may include multiple, logically grouped servers 106. In one of these embodiments, the logical group of servers may be referred to as a server farm or a machine farm. In another of these embodiments, servers 106 may be geographically dispersed. In other embodiments, a machine farm may be administered as a single entity. In still other embodiments, the machine farm includes a plurality of machine farms. Servers 106 within each machine farm can be heterogeneous—one or more of servers 106 or machines 106 can operate according to one type of operating system platform (e.g., Windows, manufactured by Microsoft Corp. of Redmond, Wash.), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In the embodiment, consolidating servers 106 in this way may improve system manageability, data security, the physical security of the system, and system performance by locating servers 106 and high-performance storage systems on localized high-performance networks. Centralizing servers 106 and storage systems and coupling them with advanced system management tools allows more efficient use of server resources.

Servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alta, Calif.; the Xen hypervisor, an open source product whose development is overseen by Citrix Systems, Inc. of Fort Lauderdale, Fla.; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, Calif. Additional layers of abstraction may include Container Virtualization and Management infrastructure. Container Virtualization isolates execution of a service to the container while relaying instructions to the machine through one operating system layer per host machine. Container infrastructure may include Docker, an open source product whose development is overseen by Docker, Inc. of San Francisco, Calif.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
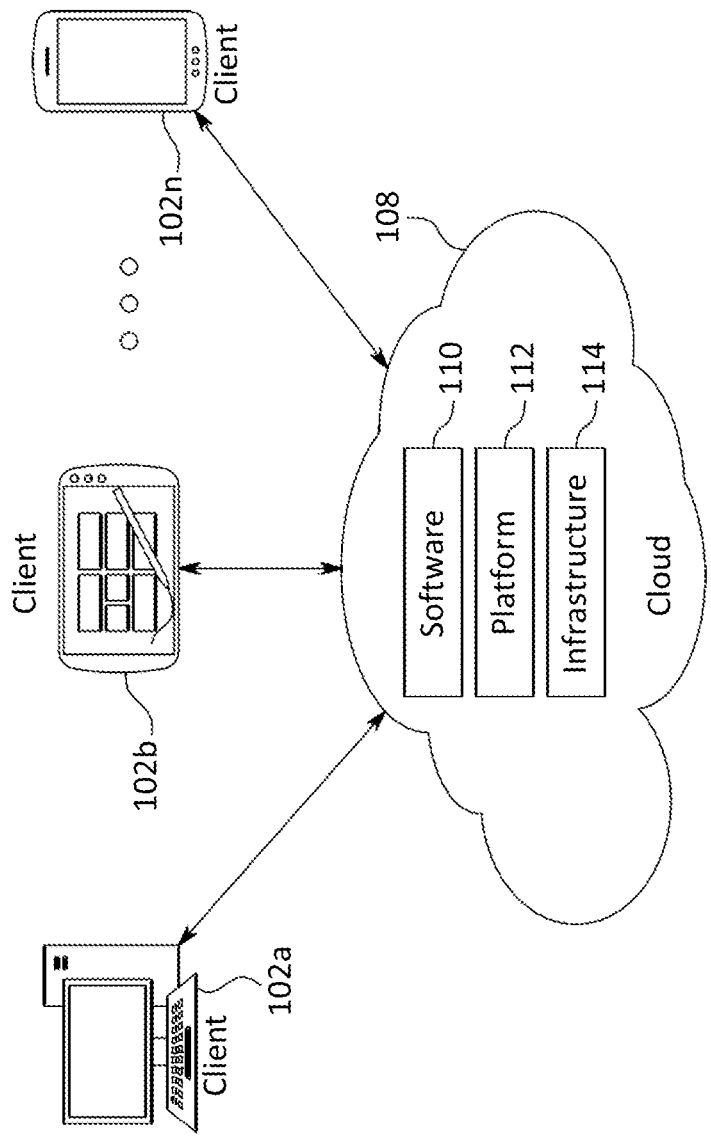
FIG. 1B is a block diagram depicting a cloud computing environment comprising client devices in communication with cloud service providers, according to some embodiments.

Referring to FIG. 1B, a cloud computing environment is depicted. A cloud computing environment may provide client 102 with one or more resources provided by a network environment. The cloud computing environment may include one or more clients 102a-102n, in communication with cloud 108 over one or more networks 104. Clients 102 may include, e.g., thick clients, thin clients, and zero clients. A thick client may provide at least some functionality even when disconnected from cloud 108 or servers 106. A thin client or zero client may depend on the connection to cloud 108 or server 106 to provide functionality. A zero client may depend on cloud 108 or other networks 104 or servers 106 to retrieve operating system data for the client device 102. Cloud 108 may include back end platforms, e.g., servers 106, storage, server farms or data centers.

Cloud 108 may be public, private, or hybrid. Public clouds may include public servers 106 that are maintained by third parties to clients 102 or the owners of the clients. Servers 106 may be located off-site in remote geographical locations as disclosed above or otherwise. Public clouds may be connected to servers 106 over a public network. Private clouds may include private servers 106 that are physically maintained by clients 102 or owners of clients. Private clouds may be connected to servers 106 over a private network 104. Hybrid clouds 109 may include both the private and public networks 104 and servers 106.

Cloud 108 may also include a cloud-based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Wash., Rackspace Cloud provided by Rackspace Inc. of San Antonio, Tex., Google Compute Engine provided by Google Inc. of Mountain View, Calif., or RightScale provided by RightScale, Inc. of Santa Barbara, Calif. PaaS providers may offer functionality provided by IaaS, including, e.g., storage, networking, servers, virtualization or containerization, as well as additional resources, e.g., the operating system, middleware, or runtime resources. Examples of PaaS include Windows Azure provided by Microsoft Corporation of Redmond, Wash., Google App Engine provided by Google Inc., and Heroku provided by Heroku, Inc. of San Francisco Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, Calif., or Office365 provided by Microsoft Corporation. Examples of SaaS may also include storage providers, e.g. Dropbox provided by Dropbox Inc. of San Francisco, Calif., Microsoft OneDrive provided by Microsoft Corporation, Google Drive provided by Google Inc., or Apple iCloud provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over a Hypertext Transfer Protocol (HTTP) and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources using web-based user interfaces, provided by a web browser (e.g. Google Chrome, Microsoft Internet Explorer, or Mozilla Firefox provided by Mozilla Foundation of Mountain View, Calif.). Clients 102 may also access SaaS resources through smartphone or tablet applications, including e.g., Salesforce Sales Cloud, or Google Drive App. Clients 102 may also access SaaS resources through the client operating system, including e.g. Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Client 102 and server 106 may be deployed as and/or executed on any type and form of computing device, e.g., a computer, network device or appliance capable of communicating on any type and form of network and performing the operations described herein.

Figure 1C:
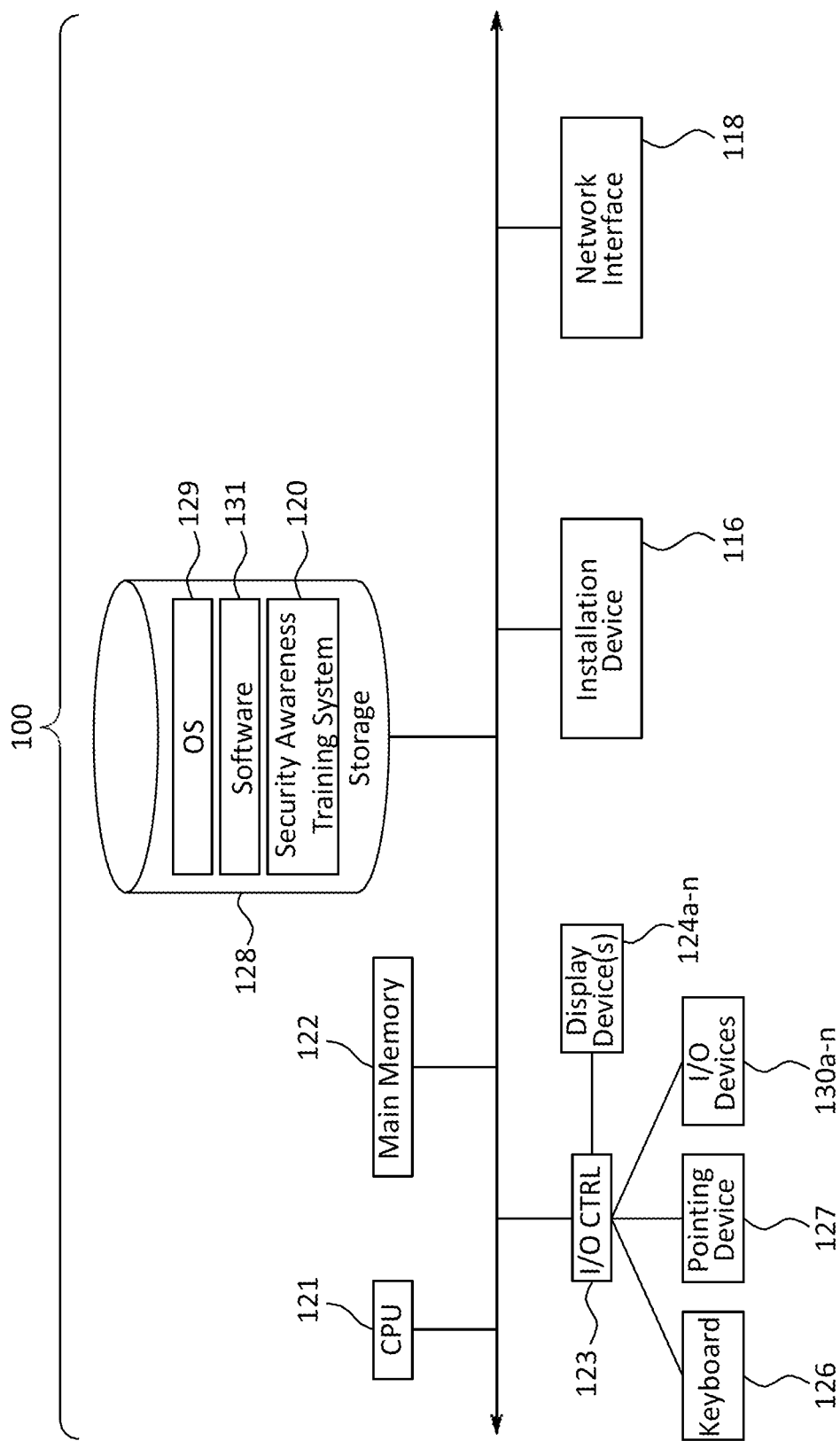
FIGS. 1C and 1D are block diagrams depicting embodiments of computing devices useful in connection with the methods and systems described herein, according to some embodiments.
Figure 1D:
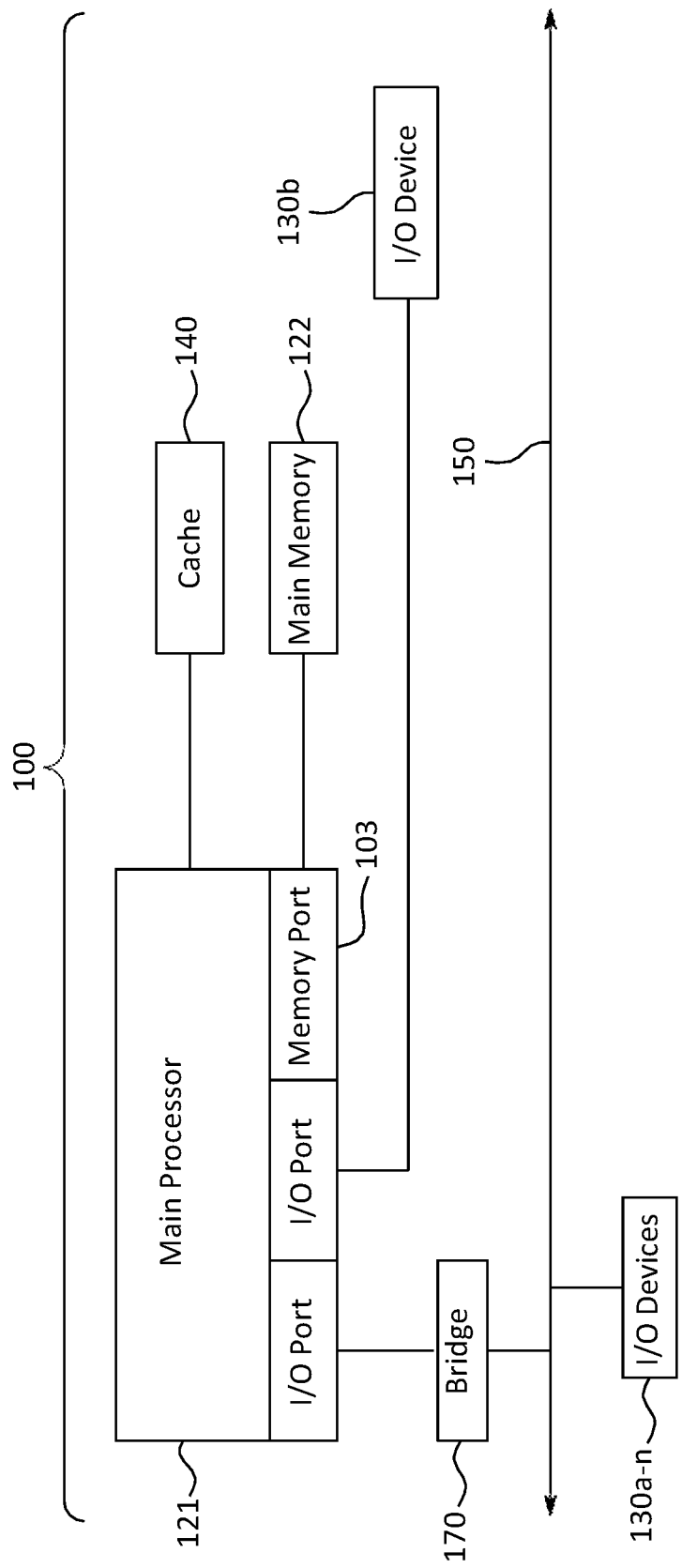

FIGS. 1C and 1D depict block diagrams of a computing device 100 useful for practicing an embodiment of client 102 or server 106. As shown in FIGS. 1C and 1D, each computing device 100 includes central processing unit 121, and main memory unit 122. As shown in FIG. 1C, computing device 100 may include storage device 128, installation device 116, network interface 118, and I/O controller 123, display devices 124a-124n, keyboard 126 and pointing device 127, e.g., a mouse. Storage device 128 may include, without limitation, operating system 129, software 131, and a software of security awareness training system 120. As shown in FIG. 1D, each computing device 100 may also include additional optional elements, e.g., a memory port 103, bridge 170, one or more input/output devices 130a-130n (generally referred to using reference numeral 130), and cache memory 140 in communication with central processing unit 121.

Central processing unit 121 is any logic circuity that responds to and processes instructions fetched from main memory unit 122. In many embodiments, central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. Computing device 100 may be based on any of these processors, or any other processor capable of operating as described herein. Central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, main memory 122 or storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. Main memory 122 may be based on any of the above described memory chips, or any other available memory chips capable of operating as described herein. In the embodiment shown in FIG. 1C, the processor 121 communicates with main memory 122 via system bus 150 (described in more detail below). FIG. 1D depicts an embodiment of computing device 100 in which the processor communicates directly with main memory 122 via memory port 103. For example, in FIG. 1D main memory 122 may be DRDRAM.

FIG. 1D depicts an embodiment in which the main processor 121 communicates directly with cache memory 140 via a secondary bus, sometimes referred to as a backside bus. In other embodiments, main processor 121 communicates with cache memory 140 using system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via local system bus 150. Various buses may be used to connect central processing unit 121 to any of I/O devices 130, including a PCI bus, a PCI-X bus, or a PCI-Express bus, or a NuBus. For embodiments in which the I/O device is video display 124, the processor 121 may use an Advanced Graphic Port (AGP) to communicate with display 124 or the I/O controller 123 for display 124. FIG. 1D depicts an embodiment of computer 100 in which main processor 121 communicates directly with I/O device 130*b* or other processors via HYPERTRANSPORT, RAPIDIO, or INFINIBAND communications technology. FIG. 1D also depicts an embodiment in which local busses and direct communication are mixed: the processor 121 communicates with I/O device 130*a* using a local interconnect bus while communicating with I/O device 130*b* directly.

A wide variety of I/O devices 130*a*-130*n* may be present in computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130*a*-130*n* may include a combination of multiple input or output devices, including, e.g., Microsoft KINECT, Nintendo Wiimote for the WII, Nintendo WII U GAMEPAD, or Apple iPhone. Some devices 130*a*-130*n* allow gesture recognition inputs through combining some of the inputs and outputs. Some devices 130*a*-130*n* provide for facial recognition which may be utilized as an input for different purposes including authentication and other commands. Some devices 130*a*-130*n* provide for voice recognition and inputs, including, e.g., Microsoft KINECT, SIRI for iPhone by Apple, Google Now or Google Voice Search, and Alexa by Amazon.

Additional devices 130*a*-130*n* have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130*a*-130*n*, display devices 124*a*-124*n* or group of devices may be augmented reality devices. The I/O devices may be controlled by I/O controller 123 as shown in FIG. 1C. The I/O controller may control one or more I/O devices, such as, e.g., keyboard 126 and pointing device 127, e.g., a mouse or optical pen. Furthermore, an I/O device may also provide storage and/or installation medium 116 for computing device 100. In still other embodiments, computing device 100 may provide USB connections (not shown) to receive handheld USB storage devices. In further embodiments, a I/O device 130 may be a bridge between the system bus 150 and an external communication bus, e.g. a USB bus, a SCSI bus, a FireWire bus, an Ethernet bus, a Gigabit Ethernet bus, a Fiber Channel bus, or a Thunderbolt bus.

In some embodiments, display devices 124*a*-124*n* may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124*a*-124*n* may also be a head-mounted display (HMD). In some embodiments, display devices 124*a*-124*n* or the corresponding I/O controllers 123 may be controlled through or have hardware support for OPENGL or DIRECTX API or other graphics libraries.

In some embodiments, computing device 100 may include or connect to multiple display devices 124*a*-124*n*, which each may be of the same or different type and/or form. As such, any of I/O devices 130*a*-130*n* and/or the I/O controller 123 may include any type and/or form of suitable hardware, software, or combination of hardware and software to support, enable or provide for the connection and use of multiple display devices 124*a*-124*n* by computing device 100. For example, computing device 100 may include any type and/or form of video adapter, video card, driver, and/or library to interface, communicate, connect or otherwise use display devices 124a-124n. In one embodiment, a video adapter may include multiple connectors to interface to multiple display devices 124a-124n. In other embodiments, computing device 100 may include multiple video adapters, with each video adapter connected to one or more of display devices 124a-124n. In some embodiments, any portion of the operating system of computing device 100 may be configured for using multiple displays 124a-124n. In other embodiments, one or more of the display devices 124a-124n may be provided by one or more other computing devices 100a or 100b connected to computing device 100, via network 104. In some embodiments, software may be designed and constructed to use another computer's display device as second display device 124a for computing device 100. For example, in one embodiment, an Apple iPad may connect to computing device 100 and use the display of the device 100 as an additional display screen that may be used as an extended desktop. One ordinarily skilled in the art will recognize and appreciate the various ways and embodiments that computing device 100 may be configured to have multiple display devices 124a-124n.

Referring again to FIG. 1C, computing device 100 may comprise storage device 128 (e.g. one or more hard disk drives or redundant arrays of independent disks) for storing an operating system or other related software, and for storing application software programs such as any program related to security awareness training system 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to computing device 100 via bus 150. Some storage device 128 may be external and connect to computing device 100 via a I/O device 130 that provides an external bus. Some storage device 128 may connect to computing device 100 via network interface 118 over network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Computing device 100 (e.g., client device 102) may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on client device 102. An application distribution platform may include a repository of applications on server 106 or cloud 108, which clients 102a-102n may access over a network 104. An application distribution platform may include application developed and provided by various developers. A user of client device 102 may select, purchase and/or download an application via the application distribution platform.

Furthermore, computing device 100 may include a network interface 118 to interface to network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. Network interface 118 may comprise a built-in network adapter, network interface card, PCMCIA network card, EXPRESSCARD network card, card bus network adapter, wireless network adapter, USB network adapter, modem or any other device suitable for interfacing computing device 100 to any type of network capable of communication and performing the operations described herein.

Computing device 100 of the sort depicted in FIGS. 1B and 1C may operate under the control of an operating system, which controls scheduling of tasks and access to system resources. Computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Wash.; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

Computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. Computer system 100 has sufficient processor power and memory capacity to perform the operations described herein. In some embodiments, computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, computing device 100 is a gaming system. For example, the computer system 100 may comprise a PLAYSTATION 3, or PERSONAL PLAYSTATION PORTABLE (PSP), PLAYSTATION VITA, PLAYSTATION 4, or a PLAYSTATION 4 PRO device manufactured by the Sony Corporation of Tokyo, Japan, or a NINTENDO DS, NINTENDO 3DS, NINTENDO WII, NINTENDO WII U, or a NINTENDO SWITCH device manufactured by Nintendo Co., Ltd., of Kyoto, Japan, or an XBOX 360 device manufactured by Microsoft Corporation.

In some embodiments, computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, computing device 100 is a tablet e.g. the IPAD line of devices by Apple; GALAXY TAB family of devices by Samsung; or KINDLE FIRE, by Amazon.com, Inc. of Seattle, Wash. In other embodiments, computing device 100 is an eBook reader, e.g. the KINDLE family of devices by Amazon.com, or NOOK family of devices by Barnes & Noble, Inc. of New York City, N.Y.

In some embodiments, communications device 102 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, communications device 102 is a laptop or desktop computer equipped with a web browser and a microphone and speaker system, e.g. a telephony headset. In these embodiments, communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, the information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods of Simulated Phishing Campaign Contextualization

The following describes systems and methods for contextualizing a simulated phishing campaign through modification or replacement of content to make the simulated phishing campaign more relevant and appropriate to an individual user.

The systems and methods of the present disclosure leverage a security awareness training system that generates simulated phishing campaigns that may be contextualizable according to a single user or a group of users. Simulated phishing campaigns may be described as simulated phishing attacks. A user may be an employee of an organization. A simulated phishing campaign (or a simulated phishing attack) may include one or more simulated phishing communications. In an implementation, the security awareness training system may be configured to generate a template for a simulated phishing communication that may be contextualized according to a single user or a group of users, such that the simulated phishing communication generated with the template is contextually more relevant to the single user or group of users. In an implementation, the template for the simulated phishing communication may be initially automatically created by the security awareness training system. In some implementations, a system administrator of the organization may manually create the template for the simulated phishing communication. In an example, the template for the simulated phishing communication may be contextualized such that the simulated phishing communication can be delivered to users located in multiple countries and speaking multiple languages, or located in the same country but speaking multiple languages. In an implementation, a simulated phishing communication may itself be used as a template for a simulated phishing communication that may be contextualized according to a single user or a group of users, such that the simulated phishing communication generated with the template is contextually more relevant to the individual users.

The systems and methods of the present disclosure may also leverage a contextualization engine, a translation engine, and/or a localization engine that may receive the template for the simulated phishing communication from the security awareness training system or the system administrator and process the template for the simulated phishing communication to generate one or more contextualized simulated phishing communications for a user or a group of users. In an implementation, the contextualization engine, the translation engine, and/or the localization engine may generate the one or more contextualized simulated phishing communications for the user or the group of users based on contextual parameters corresponding to the user or to each user of the group of users, to make the one or more contextualized simulated phishing communications more relevant and appropriate to individual users. A contextual parameter for a user may include information associated with the user that may be used to make a simulated phishing communication more relevant to that user.

In an implementation, the contextualization engine may generate a contextualized simulated phishing communication for a user based on one or more contextual parameters for the user. In an example, the one or more contextual parameters for the user may include one or more of the following—language spoken by the user, locale of the user, temporal changes (for example, time at which the user changes the locale), job title of the user, job department of the user, religious belief of the user, topic of communication, subject of communication, name of manager or subordinate of the user, industry, address (for example, Zip Code™ and street), name or nickname of the user, subscriptions, preferences, recent browsing history, transaction history, recent communications with peers/managers/human resource partners/banking partners, regional currency and units, and any other information associated with the user. In an example, the contextualization engine may modify the content of the simulated phishing communication to include the name of a manager of the user. Accordingly, if the contextualized simulated phishing communication may appear to be from the manager of the user, then is highly likely for the user to trust the contextualized simulated phishing communication and interact with the contextualized simulated phishing communication.

In an implementation, the localization engine may modify the content of the simulated phishing communication to make the content more relevant and appropriate to individual users in different locales. For example, the localization engine may modify the content of the simulated phishing communication for the user based on a country or a region in which the user is located. In an example, the localization engine may modify the content of the simulated phishing communication to include country-specific content, for example, a name of a bank or other institution located in the country of the user. Further, in an implementation, the translation engine may generate a contextualized simulated phishing communication for the user based on modifying the content of the simulated phishing communication according to a language spoken by the user.

Accordingly, by processing the content of the simulated phishing communication from the template in accordance with multiple contextual parameters in combination such that the content is subjected to translation, localization, and contextualization, highly relevant contextualized simulated phishing communications are generated. The highly relevant contextualized simulated phishing communications may be provided to multiple users in multiple locales, and having multiple roles. Thus, using the single template for the simulated phishing communication, multiple contextualized simulated phishing communications are generated. In embodiments a simulated phishing communication is used as a template for the multiple contextualized simulated phishing communications that may be generated. As a result, efficiency of the system is significantly improved.

Figure 2:
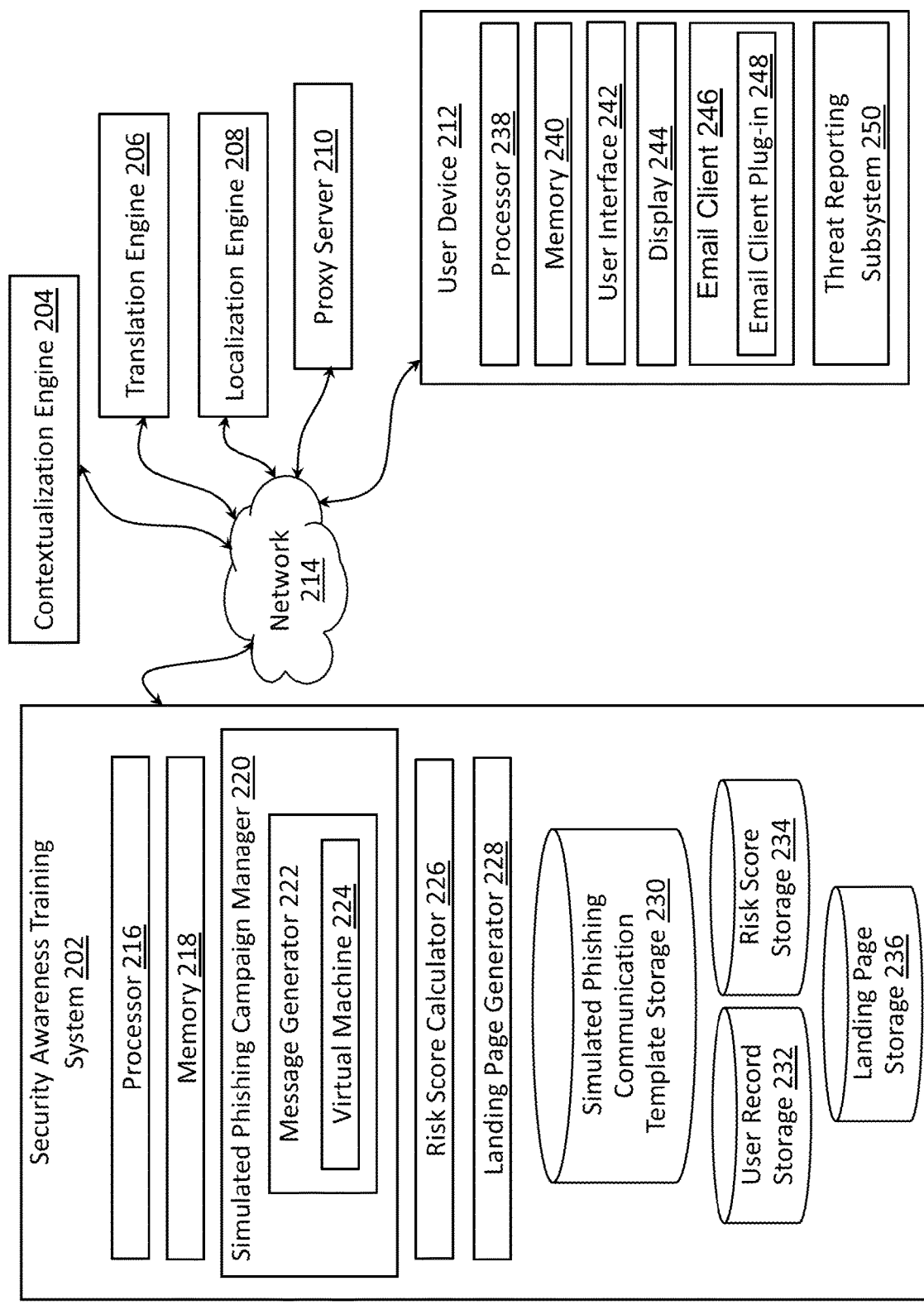
FIG. 2 depicts an implementation of some of an architecture of an implementation of a system for contextualizing a simulated phishing communication based at least on one of a language and a locale, according to some embodiments.

FIG. 2 depicts an implementation of some of an architecture of an implementation of system 200 for contextualizing a simulated phishing communication based at least on one of a language and a locale, according to some embodiments.

System 200 may include security awareness training system 202, contextualization engine 204, translation engine 206, localization engine 208, proxy server 210, user device 212, and network 214 enabling communication between the system components for information exchange. Network 214 may be an example or instance of network 104, details of which are provided with reference to FIG. 1A and its accompanying description.

According to some embodiments, each of security awareness training system 202, contextualization engine 204, translation engine 206, localization engine 208, and proxy server 210 may be implemented in a variety of computing systems, such as a mainframe computer, a server, a network server, a laptop computer, a desktop computer, a notebook, a workstation, and any other computing system. In an implementation, each of security awareness training system 202, contextualization engine 204, translation engine 206, localization engine 208, and proxy server 210 may be implemented in a server, such as server 106 shown in FIG. 1A. In some implementations, security awareness training system 202, contextualization engine 204, translation engine 206, localization engine 208, and proxy server 210 may be implemented by a device, such as computing device 100 shown in FIGS. 1C and 1D. In some embodiments, each of security awareness training system 202, contextualization engine 204, translation engine 206, localization engine 208, and proxy server 210 may be implemented as a part of a cluster of servers. In some embodiments, each of security awareness training system 202, contextualization engine 204, translation engine 206, localization engine 208, and proxy server 210 may be implemented across a plurality of servers, thereby, tasks performed by each of security awareness training system 202, contextualization engine 204, translation engine 206, localization engine 208, and proxy server 210 may be performed by the plurality of servers. These tasks may be allocated among the cluster of servers by an application, a service, a daemon, a routine, or other executable logic for task allocation.

In one or more embodiments, security awareness training system 202 may facilitate cybersecurity awareness training via simulated phishing attacks. In some implementations, security awareness training system 202 may be owned or managed or otherwise associated with an organization or any entity authorized thereof. A simulated phishing attack is a technique of testing a user to see whether the user is likely to recognize a true malicious phishing attack and act appropriately upon receiving the malicious phishing attack. The simulated phishing attack may include links, attachments, macros, or any other simulated phishing threat that resembles a real phishing threat. In response to a user interaction with the simulated phishing attack, for example if the user clicks on a link (i.e., a simulated phishing link), the user may be provided with security awareness training. In an example, security awareness training system 202 may be a Computer Based Security Awareness Training (CBSAT) system that performs security services such as performing simulated phishing attacks on a user or a set of users of the organization as a part of security awareness training. In some embodiments, the user may be an employee of the organization, a customer, or a vendor. In some embodiments, the user may be an end-customer/consumer or a patron using the goods and/or services of the organization.

According to some embodiments, security awareness training system 202 may include processor 216 and memory 218. For example, processor 216 and memory 218 of security awareness training system 202 may be CPU 121 and main memory 122 respectively as shown in FIGS. 1C and 1D. Further, security awareness training system 202 may include simulated phishing campaign manager 220. Simulated phishing campaign manager 220 may include various functionalities that may be associated with cybersecurity awareness training. In an implementation, simulated phishing campaign manager 220 may be an application or a program that manages various aspects of a simulated phishing attack, for example, tailoring and/or executing a simulated phishing attack. A simulated phishing attack may test the readiness of a user to handle phishing attacks such that malicious actions are prevented. For instance, simulated phishing campaign manager 220 may monitor and control timing of various aspects of a simulated phishing attack including processing requests for access to attack results, and performing other tasks related to the management of a simulated phishing attack.

In some embodiments, simulated phishing campaign manager 220 may include message generator 222 having a virtual machine 224. Message generator 222 may be an application, service, daemon, routine, or other executable logic for generating messages. The messages generated by message generator 222 may be of any appropriate format. For example, the messages may be email messages, text messages, short message service (SMS) messages, instant messaging (IM) messages used by messaging applications such as WhatsApp™, or any other type of message. The message type to be used in a particular simulated phishing communication may be determined by, for example, simulated phishing campaign manager 220. The messages may be generated in any appropriate manner, e.g. by running an instance of an application that generates the desired message type, such as a Gmail® application, Microsoft Outlook™, WhatsApp™, a text messaging application, or any other appropriate application. The messages may be generated by running a messaging application on virtual machine 224 or may be run in any other appropriate environment. The messages may be generated to be in a format consistent with specific messaging platforms, for example Outlook 365™, Outlook® Web Access (OWA), Webmail™, iOS®, Gmail®, and any other messaging platform. In an implementation, message generator 222 may be configured to generate simulated phishing communications. The simulated phishing communications may be used in simulated phishing attacks or in simulated phishing campaigns.

Referring again to FIG. 2, in some embodiments, security awareness training system 202 may include risk score calculator 226. Risk score calculator 226 may be an application or a program for determining and maintaining risk scores for users in an organization. A risk score of a user may be a representation of vulnerability of the user to a malicious attack. In an implementation, risk score calculator 226 may maintain more than one risk score for each user. Each such risk score may represent vulnerability of the user for a specific cyberattack. In an implementation, risk score calculator 226 may calculate risk scores for a group of users, the organization, an industry to which the organization belongs, a geography, and any other categorization. In an example, the risk score of a user may be modified based on the user's responses to simulated phishing communications, completion of training by the user, a current position of the user in the organization, a size of a network of the user, an amount of time the user has held the current position in the organization, and/or any other attribute that can be associated with the user.

According to some embodiments, security awareness training system 202 may include landing page generator 228. In an implementation, landing page generator 228 may be an application or a program for creation or modification of landing pages to facilitate security awareness training of users in the organization. In an example, a landing page may be a webpage or an element of a webpage that appears in response to a user interaction with a simulated phishing communication such as clicking on a link, downloading an attachment or other interactions to provision training materials.

In some embodiments, security awareness training system 202 may include simulated phishing communication template storage 230, user record storage 232, risk score storage 234, and landing page storage 236. In an implementation, simulated phishing communication template storage 230 may store simulated phishing communication templates, and user record storage 232 may store one or more contextual parameters for each user of an organization. A contextual parameter for a user may include information associated with the user that may be used to make a simulated phishing communication more relevant to that user. In an example, one or more contextual parameters for a user may include one or more of the following—language spoken by the user, locale of the user, temporal changes (for example, time at which the user changes the locale), job title of the user, job department of the user, religious belief of the user, topic of communication, subject of communication, name of manager or subordinate of the user, industry, address (for example, Zip Code™ and street), name or nickname of the user, subscriptions, preferences, recent browsing history, transaction history, recent communications with peers/managers/human resource partners/banking partners, regional currency and units, and any other information associated with the user.

In some embodiments, security awareness training system 202 may receive the one or more contextual parameters for the users from multiple sources. In an example, security awareness training system 202 may receive the one or more contextual parameters from a system administrator and individual users. In another example, the system administrator may manually input the contextual parameters for the users. In another example, security awareness training system 202 may receive an input from a user on user's preference for one of a target language and/or a target locale. In some examples, the contextual parameters may be derived from user's device settings, or through synchronization with an Active Directory, or any other repository of user data. For example, security awareness training system 202 may determine a location of a user based on a mobile device of the user or an Internet Protocol (IP) address look up. In some embodiments, security awareness training system 202 may obtain the one or more contextual parameters for the user from data associated with the user obtained from user devices or proxy server 210. For example, security awareness training system 202 may obtain user browsing data, social media data, Really Simple Syndication (RSS) feeds, subscriptions, or any other information. Also, proxy server 210 may collect one or more contextual parameters by collecting information such as browsing history, communications from and to the user, and other information that may serve as one or more contextual parameters. The one or more contextual parameters may be continuously or dynamically collected and updated in user record storage 232.

In an example, when a user interacts with security awareness training system 202, for example to receive training, some of the one or more contextual parameters may be set or provided by the user. In an example, the user may indicate his or her preferred language to security awareness training system 202. When the user indicates his or her preferred language to security awareness training system 202, all content from security awareness training system 202 is delivered according to the user's preferred language. In an example, a change in the preferred language is applied to the user interface, the template for the simulated phishing communications, the landing pages, and the training content. In an implementation, the system administrator of the organization may be enabled to override the user's preferred language and other contextual parameters. Also, the system administrator of the organization may mandate training to the user in a source language in addition to the preferred language as the user may travel to different offices of the organization.

Further, risk score storage 234 may store risk scores of users and landing page storage 236 may store landing page templates. The simulated phishing communication templates stored in simulated phishing communication template storage 230, the one or more contextual parameters for the users stored in user record storage 232, the risk scores of the users stored in risk score storage 234, and the landing page templates stored in landing page storage 236 may be periodically or dynamically updated as required. Although, it has been described that user record storage 232 is implemented in security awareness training system 202, in some embodiments, user record storage 232 may be implemented in contextualization engine 204.

According to some embodiments, contextualization engine 204 may be an application or a program configured to contextualize simulated phishing communications, training sessions, training notifications, or any user facing aspect of security awareness training system 202. In an example, contextualization engine 204 may adapt or modify content of simulated phishing communications in accordance with contextual parameters for users stored in user record storage 232 to make the simulated phishing communications more relevant or more believable to intended users. In one or more embodiments, contextualization engine 204 may use Artificial Intelligence (AI), Machine Learning (ML) techniques, or any other technology to improvise and effectively contextualize simulated phishing communications to make the simulated phishing communications more contextually relevant and believable to target users.

Referring to FIG. 2, in some embodiments, translation engine 206 may be an application or a program configured to translate content from one language to another language. In an implementation, translation engine 206 may render simulated phishing communications, training sessions, training notifications, or any user facing aspect of security awareness training system 202 in a language different from the language in which content of the simulated phishing communications, training sessions, and training notifications were originally created. In one or more embodiments, translation engine 206 may be a third-party program or application integrated with applications of the organization. For example, translation engine 206 may be a customized version of known translation Application Programming Interfaces (APIs) such as Google® translate API. In another example, translation engine 206 may be known applications such as Transifex®, Smartling®, Systran®, and Linguatec®. In one or more embodiments, translation engine 206 may be a proprietary program or application developed and maintained by the organization or provided by a third-party vendor. In one or more embodiments, translation engine 206 may apply AI, ML techniques, and other technologies to improvise and effectively translate simulated phishing communications, training sessions, training notifications, or any user facing aspect of security awareness training system 202 in a language different from a language in which content of the simulated phishing communications was originally created. In an embodiment, the translated simulated phishing communications may be manually reviewed by a translation professional to fine tune various aspects of the machine translated simulated phishing communications. In some embodiments, the content of the simulated phishing communications may be sent to user device 212. A translation professional may then manually translate the content of the simulated phishing communications. The translated content of the simulated phishing communications may be received by security awareness training system 202, via user device 212, and stored in simulated phishing communication storage 230 for further processing. The translated simulated phishing communications may be reviewed and/or further processed by translation engine 206 to learn or further fine tune the translations. In some implementations, translation engine 206 may be able to translate simulated phishing content in up to fifty languages. In some implementations, translation engine 206 may be able to translate simulated phishing content to more than fifty languages. In examples, translation engine 206 may be translate the simulated phishing content into different dialects.

According to some embodiments, localization engine 208 may be a program or an application configured to render simulated phishing communications, training sessions, training notifications, or any user facing aspect of security awareness training system 202 to be relevant to users' geographical locations.

According to some embodiments, proxy server 210 may be a server application that is intermediary between a client and a server. In an example, proxy server 210 may act as an intermediary for requests from users of an organization seeking resources such as webpages, social media feeds, or any other resources from various resource servers that provide those resources. In an example, proxy server 210 may function on behalf of the users when requesting resources, while sometimes potentially masking the origin of the requests to the resource servers. Known examples of proxy server 210 include Apache™ HTTP server and WinGate®.

Although security awareness training system 202, contextualization engine 204, translation engine 206, localization engine 208, and proxy server 210 are shown as separate entities, security awareness training system 202, contextualization engine 204, translation engine 206, localization engine 208, and proxy server 210 may be implemented as a single entity and managed by the organization or any entity authorized thereof.

Referring again to FIG. 2, in some embodiments, user device 212 may be any device used by a user. The user may be an employee of an organization or any entity. According to some embodiments, user device 212 may include processor 238 and memory 240. In an example, processor 238 and memory 240 of user device 212 may be CPU 121 and main memory 122, respectively, as shown in FIGS. 1C and 1D. User device 212 may also include user interface 242 such as a keyboard, a mouse, a touch screen, a haptic sensor, voice-based input unit, or any other appropriate user interface. It shall be appreciated that such components of user device 212 may correspond to similar components of computing device 100 in FIGS. 1C and 1D, such as keyboard 126, pointing device 127, I/O devices 130a-n and display devices 124a-n. User device 212 may also include display 244, such as a screen, a monitor connected to the device in any manner, or any other appropriate display. In an implementation, user device 212 may display received content (for example, simulated phishing communications) for the user using display 244 and is able to accept user interaction via user interface 242 responsive to the displayed content.

Referring again to FIG. 2, in some embodiments, user device 212 may include email client 246 and threat reporting subsystem 250. In one example implementation, email client 246 may be an application installed on user device 212. In another example implementation, email client 246 may be an application that can be accessed over network 214 through a browser without requiring to be installed on user device 212. In an implementation, email client 246 may be any application capable of composing, sending, receiving, and reading email messages. For example, email client 246 may be an instance of an application, such as Microsoft Outlook™ application, IBM® Lotus Notes® application, Apple® Mail application, Gmail® application, or any other known or custom email application. In an implementation, email client 246 may be configured to receive simulated phishing communications from security awareness training system 202. In an example, a user of user device 212 may be mandated to download and install email client 246 by the organization. In another example, email client 246 may be provided by the organization as default. In some examples, a user of user device 212 may select, purchase and/or download email client 246, through for example, an application distribution platform. The term "application" as used herein may refer to one or more applications, services, routines, or other executable logic or instructions.

In one or more embodiments, email client 246 may include email client plug-in 248. An email client plug-in may be an application program that may be added to an email client for providing one or more additional features to enable customization. The email client plug-in may be provided by the same entity that provides the email client software, or may be provided by a different entity. In an example, email client plug-in may include plug-ins providing a User Interface (UI) element such as a button to trigger a function. Functionality of client-side plug-ins that use a UI button may be triggered when a user clicks the button. Some examples of client-side plug-ins that use a button UI include, but are not limited to, a Phish Alert Button (PAB) plug-in, a task create plug-in, a spam marking plug-in, an instant message plug-in, a social media reporting plug-in and a search and highlight plug-in. In an embodiment, email client plug-in 248 may be any of the aforementioned types or may be of any other type.

In some implementations, email client plug-in 248 may not be implemented in email client 246 but may coordinate and communicate with email client 246. In some implementations, email client plug-in 248 is an interface local to email client 246 that supports email client users. In one or more embodiments, email client plug-in 248 may be an application that supports the user, i.e., recipients of simulated phishing communications, to report suspicious phishing communications that they believe may be a threat to them or their organization. Other implementations of email client plug-in 248 not discussed here are contemplated herein. In one example, email client plug-in 248 may provide a Phish Alert Button (PAB) plug-in through which functions or capabilities of email client plug-in 248 are triggered/activated by a user action on the button. Upon activation, email client plug-in 248 may forward content (for example, suspicious phishing communications) to a security administrator. In some embodiments, email client plug-in 248 may cause email client 246 to forward content to threat reporting subsystem 250 or the system administrator, or an Incident Response (IR) team of the organization for threat triage or threat identification. In some embodiments, email client 246 or email client plug-in 248 may send a notification to security awareness training system 202 that a user has reported content received at email client 246 as potentially malicious. Thus, the PAB plug-in button enables a user to report suspicious content.

In an implementation, threat reporting subsystem 250 may be an electronic system for receiving content that the user has reported as suspicious or likely to be malicious. Further, threat reporting subsystem 250 may host applications that provide additional and/or custom features to user device 212. Although it is shown that threat reporting subsystem 250 is implemented in user device 212, in some embodiments, threat reporting subsystem 250 may be implemented in security awareness training system 202.

In operation, as a part of cybersecurity awareness training, security awareness training system 202 may be configured to generate templates for simulated phishing campaigns or simulated phishing attacks to be sent out to users of an organization. In one or more embodiments, some of the templates may be created or modified by the system administrator, or cybersecurity experts of the organization or by personnel contracted by the organization. A simulated phishing campaign may include at least one simulated phishing communication. In an implementation, simulated phishing campaign manager 220 may modify, replace, alter, or remove one or more malicious elements of a malicious phishing communication to create a template for a simulated phishing communication. In an example, simulated phishing campaign manager 220 may remove a malicious advertisement from a webpage and replace the malicious advertisement with a benign advertisement. In another example, simulated phishing campaign manager 220 may remove a malicious attachment from an email and replace it with a benign attachment. According to some embodiments, message generator 222 may be configured to create a template for a simulated phishing communication. In an implementation, message generator 222 may create the template for the simulated phishing communication using resources available with security awareness training system 202. In some implementations, a system administrator may create an initial template for the simulated phishing communication. In an example, the template for the simulated phishing communication may be contextualizable according to a single user or a group of users, such that the simulated phishing communication generated with the template is contextually more relevant to the user or the group of users. Simulated phishing campaign manager 220 may update the template based on learnings from simulated phishing campaigns and updates in cybersecurity systems in recognizing threats.

In an implementation, message generator 222 may create a template for a simulated phishing communication with content in a source language. The source language may be understood as a language in which the content of the simulated phishing communication is originally created. In an implementation, message generator 222 may generate the template for the simulated phishing communication according to settings of security awareness training system 202. For example, message generator 222 may generate the template for the simulated phishing communication according to a default language setting of security awareness training system 202. In other words, the source language of the content may be the default language of security awareness training system 202. In some examples, the source language may be any language configured or set by the system administrator. For example, the source language may be English or any other known language. In some implementations, the system administrator may manually create the template for the simulated phishing communication. According to an embodiment, message generator 222 may store the template for the simulated phishing communication in simulated phishing communication template storage 230.

According to an embodiment, whenever the simulated phishing communication is to be contextualized for a user, contextualization engine 204, translation engine 206, and/or localization engine 208 may retrieve the template for the simulated phishing communication from simulated phishing communication template storage 230 of security awareness training system 202. In some embodiments, security awareness training system 202 may provide the template for the simulated phishing communication to contextualization engine 204, translation engine 206, and/or localization engine 208 in response to a request from contextualization engine 204, translation engine 206, and/or localization engine 208. In an example, content of the template for the simulated phishing communication may be in the source language.

In an implementation, contextualization engine 204 may identify one or more contextual parameters for the user. Contextualization engine 204 may retrieve the one or more contextual parameters for the user from user record storage 232 of security awareness training system 202. In an example, the one or more contextual parameters for the user may include one or more of the following—language spoken by the user, locale of the user, temporal changes (for example, the time at which the user changes their locale), job title of the user, job department of the user, religious belief of the user, topic of communication, subject of communication, name of manager or subordinate of the user, industry, address, name or nickname of the user, subscriptions, preferences, recent browsing history, recent transaction history, recent communications with peers/manager/human resource partners/banking partners, social events, and regional currency and units, and any other information associated with the user. In an example, the one or more contextual parameters may identify at least one of a target language and a target locale. The target language may refer to a language into which the content of the simulated phishing communication is to be translated. In an example, the target language may be any language that is relevant to the user. For example, the target language may be a preferred language of the user or a language spoken by the user. In some examples, the target language may be a dialect of a language. A dialect may be a regional or social variety of a language distinguished by pronunciation, grammar, and/or vocabulary. Further, the target locale may refer to a geographic location of the user. For example, the target locale may refer to a city, a country, a state, a ZIP Code™, a county, and/or a province of the user.

In some embodiments, contextualization engine 204 may process the template for the simulated phishing communication in accordance with the one or more contextual parameters for the user to create a contextualized simulated phishing communication that is more relevant and appropriate to the user. In one or more embodiments, contextualization engine 204 uses one or more contextual parameters associated with the user to build relevancy into the simulated phishing communication. Using a greater number of contextual parameters associated with the user may increase the relevancy of the simulated phishing communication. In an implementation, contextualization engine 204 may replace original content of the simulated phishing communication with content that is appropriate for the user using Natural Language Processing (NLP), AI, ML, and/or other analysis techniques. In an example, contextualization engine 204 may automatically parse information, such as a job title/role of the user, name of the manager or the supervisor of the user, or other data specific to the user to enable the content to be replaced by information that is relevant to the user. In an example, contextualization engine 204 may modify/change the content of the simulated phishing communication to appear to be from a trusted individual, such as the manager of the user. In another example, contextualization engine 204 may modify/change the content of the simulated phishing communication according to the job role of the user. For example, if the job role of the user is "Accountant", contextualization engine 204 may modify/change the content of the simulated phishing communication to include a financial balance sheet of the user's organization. In some examples, contextualization may be achieved based on tagging of content that may need to be adapted for the user at the time for the configuration of the simulated phishing communication by security awareness training system 202.

In an implementation, contextualization engine 204 may provide priority to some contextual parameters over other contextual parameters. For example, contextualization engine 204 may determine and choose which contextual parameters take precedence over other contextual parameters in the creation of the contextualized simulated phishing communication. In an example, some priorities may be set by default. In some examples, the priorities may be set by the system administrator or learnt through results of simulated phishing campaigns. In an implementation, contextualization engine 204 may decide and execute which contextual parameters take precedence over others in the creation of the contextualized simulated phishing campaigns, training materials, and other content.

According to an embodiment, in response to the one or more contextual parameters identifying the target language, contextualization engine 204 may trigger translation engine 206 to modify the content of the template according to the target language to use in a simulated phishing communication. In an implementation, translation engine 206 may translate the content of the simulated phishing communication from the source language to the target language. In an example, translation engine 206 may translate the content of a simulated phishing communication that may originally be in English to Portuguese if the user's language is Portuguese. In some examples, translation engine 206 may translate the content of the simulated phishing communication that may originally be in American English to any other dialect of English (for example, British English, Canadian English, Australian English, or any other dialect of English) based on a known location of the user. In an implementation, translation engine 206 may modify tagged content in the content of the simulated phishing communication to be modified for the target language. According to an embodiment, translation engine 206 may translate the entire contents of the simulated phishing communication. In some embodiments, translation engine 206 may translate only a part of the content of a simulated phishing communication. For example, translation engine 206 may translate only that part of the content of simulated phishing communication which may be relevant to a target user.

In an implementation, translation engine 206 may translate the content of the simulated phishing communication from the source language (i.e., the language in which the content is originally created) to the target language (i.e., another language that is relevant/appropriate for the user) based on multiple different techniques. According to an implementation, translation engine 206 may translate the content of the simulated phishing communication using a Machine Translation (MT) technique. In an example, translation engine 206 may use rule-based methods and/or statistical analysis of a large data set of previous translations to translate the content of the simulated phishing communication. In some embodiments, a human translator may aid translation engine 206 to translate the content of the simulated phishing communication more accurately. According to some embodiments, translation engine 206 may translate the content of the simulated phishing communication using a combination of machine translation and human translation. For example, translation engine 206 may translate the content of the simulated phishing communication using a Machine-Aided Human Translation (MAHT) technique. In an implementation, translation engine 206 may provide the translated content of the simulated phishing communication to contextualization engine 204 for further processing.

In some embodiments, the translation of the content of the simulated phishing communication may be performed through proxy server 210 by implementing an instance of translation engine 206 in proxy server 210. In an implementation, proxy server 210 may determine when translation of the content of the simulated phishing communication is to be performed and accordingly, proxy server 210 may perform the translation in real-time. In some embodiments, the content of the simulated phishing communication may have already been translated and contextualization engine 204 may modify the content/template for the simulated phishing communication based on other contextual parameters.

According to an embodiment, in response to the one or more contextual parameters identifying the target locale, contextualization engine 204 may trigger localization engine 208 to modify the content from the template according to the target locale to use in a simulated phishing communication. In an implementation, localization engine 208 may replace original content of the simulated phishing communication with content that is appropriate for the locale of the user. In an implementation, localization engine 208 may perform localization of the content using the NLP technique, AI, ML, and/or other analysis techniques. In an example, localization engine 208 may attempt to automatically parse information about the user, such as a business address, a country and city in which the user resides, or other location specific data for replacing the content of the simulated phishing campaign with information that is relevant to the locale of the user. In some implementations, localization engine 208 may modify tagged content in the content of the simulated phishing communication to be modified for the target locale. For example, localization engine 208 may perform localization of the content based on tagging of the content that may need to be adapted for each locale at the time for the configuration of the simulated phishing communication by the system administrator.

According to an implementation, localization engine 208 may modify location related information in the content of the simulated phishing communication to include location related information for the target locale. Further, localization engine 208 may change the content of the simulated phishing communication to appear to be from an entity of the target locale instead of an entity of a source locale. In an example, the locale to which the content of the simulated phishing communication was originally relevant to may be referred to as the source locale. For example, if the user resides in Canada, then localization engine 208 may change the simulated phishing communication that originally appears to be from the Bank of America® to appear to be from the Royal Bank of Canada®.

In some implementations, localization engine 208 may process the content of the simulated phishing campaign based on cultural adaptation. In an implementation, localization engine 208 may modify a source image in the content of the simulated phishing communication to a target image of the target locale. In an example, if an image (i.e., the source image) in the source content of the simulated phishing communication is inappropriate to the user who resides in Germany, localization engine 208 may remove the image or change the image to an image that may be appropriate for the localized version of the template for Germany.

As may be understood, contextualization engine 204, translation engine 206, and localization engine 208, in combination, may create/generate multiple contextualized simulated phishing campaigns from the template for the simulated phishing communication generated by security awareness training system 202. In some implementations, a system administrator may create an initial template for the simulated phishing communication. Simulated phishing campaign manager 220 may use the template created by the system administrator and may trigger contextualization engine 204, translation engine 206, and localization engine 208 to create/generate multiple contextualized simulated phishing campaigns from the template for the simulated phishing communication. The multiple contextualized simulated phishing campaigns may be generated in accordance with multiple contextual parameters for the user stored in user record storage 232. In an example, as the number of contextual parameters increases, the number of contextualized simulated phishing campaigns created by the contextualization engine 204, translation engine 206, and localization engine 208 may also increase. To elaborate with an example, contextualization engine 204, translation engine 206, and localization engine 208, in combination, may create four contextualized simulated phishing communications. One contextualized simulated phishing communication may have been translated to Spanish and localized to Mexico. Another contextualized simulated phishing communication may have been translated to Spanish and localized to the United States. Yet another contextualized simulated phishing communication may have been translated to English and localized to Mexico. Yet another contextualized simulated phishing communication may have been translated to English and localized to the United States. In an example, contextualization engine 204 may select one of the four contextualized simulated phishing communications to be communicated to the user.

According to some embodiments, security awareness training system 202 may communicate the selected contextualized simulated phishing communication to one or more devices of the user with the content modified for at least one of the target language and the target locale, or any contextual parameter. In an example, the contextualized simulated phishing communication may be communicated to user device 212 of the user. Since the simulated phishing communication is contextualized based on the contextual parameters for the user, the contextualized simulated phishing communication may have a higher likelihood of being relevant to the user. In an example, if the user's preferred language is Portuguese and the contextualized simulated phishing communication is delivered to the user in Portuguese, then it is highly likely for the user to trust the contextualized simulated phishing communication. Accordingly, there is a high chance that the user may interact with the contextualized simulated phishing communication. In some examples, if the user resides in Canada and the contextualized simulated phishing communication may appear to be delivered from the Royal Bank of Canada®, then is more likely for the user to trust and interact with the contextualized simulated phishing communication than if it appeared to be delivered from the Bank of America. In some examples, if the contextualized simulated phishing communication may appear to be delivered from a trusted individual, such as a manager or a subordinate of the user, then is highly likely for the user to trust the contextualized simulated phishing communication and interact with the contextualized simulated phishing communication.

In an implementation, security awareness training system 202 may detect an interaction with the contextualized simulated phishing communication by the user. In an example, on receiving the contextualized simulated phishing communication, the user may interact with the contextualized simulated phishing communication. For example, the user may click on a link included in the contextualized simulated phishing communication or download an attachment included in the contextualized simulated phishing communication.

In an implementation, security awareness training system 202 may identify appropriate electronic training for the user based at least on the detection of an interaction with a contextualized simulated phishing communication and communicate the electronic training to the user. Security awareness training system 202 may modify the content of the electronic training according to one of the target language and the target locale before communicating the electronic training to the user. In an example, if the language of the electronic training is set as English and security awareness training system 202 determines that language of the electronic training should be French based on the contextual parameters in user record storage 232, then security awareness training system 202 changes the language of the electronic training from English to French, and delivers the electronic training to the user in French.

According to an embodiment, if the user interacts with the contextualized simulated phishing communication in any way, the user may be traversed to (or presented with) an appropriate landing page to provide description of one of a security exploit or the action taken by the user with respect to the contextualized simulated phishing communication. For example, the user may be traversed to the landing page when the user clicks on a link in the contextualized simulated phishing communication. The landing page may alert the user that the user has failed a simulated phishing attack and provide general or specific learning materials to the user.

In an example, the landing page may be any mechanism through which a user is provided training that is relevant to the specific phishing attack. In an example, the landing page may be a webpage which enables provisioning of training materials. In some examples, the landing page may be a pop-up message. A pop-up message may be understood to refer to the appearance of graphical or textual content on a display.

In some implementations, risk score calculator 226 may determine/establish a risk score of the user based at least on the action by the user with respect to the contextualized simulated phishing communication. In an example, risk score calculator 226 may determine the risk score of the user based on an action by the user such as user interaction with the contextualized simulated phishing communication. A risk score of a user quantifies a cybersecurity risk that the user poses to an organization. In implementations, a risk score of a user may be a representation of vulnerability of the user to a malicious attack. In one example, a user with a higher risk score may present a greater risk to the organization and a user with a lower risk score may present a lower risk to the organization. The user with the higher risk score may require more extensive training to identify and report phishing attacks.

In some embodiments, on receiving the contextualized simulated phishing communication, if the user suspects that the contextualized simulated phishing communication is potentially malicious, then the user may report the contextualized simulated phishing communication using email client plug-in 248. In an implementation, email client plug-in 248 may provide a UI element such as the PAB in email client 246. In an example, when the user receives the contextualized simulated phishing communication and the user suspects the contextualized simulated phishing communication to be potentially malicious, then the user may click on the UI element such as a button using, for example, a mouse pointer to report the contextualized simulated phishing communication. In some implementations, when the user reports the contextualized simulated phishing communication, email client plug-in 248 may receive an indication that the user has reported the email client plug-in 248 received at email client 246. In response to receiving the indication that the user has reported the contextualized simulated phishing communication, email client plug-in 248 may cause email client 246 to forward the contextualized simulated phishing communication (suspicious simulated phishing communication) to threat reporting subsystem 250, to the system administrator, or to the IR team that is responsible for threat triage or threat identification. In some implementations, email client plug-in 248 may present a landing page congratulating the user for identifying and reporting the contextualized simulated phishing communication as a suspicious communication to threat reporting subsystem 250. Accordingly, the risk score of the user is decreased as a response to user's awareness and reporting.

According to some embodiments, in a similar manner as described above, one or more contextual parameters of a second user different from the one or more contextual parameters of the user may be identified. The one or more contextual parameters may identify at least one of a second target language and a second target locale. Further, the content of the simulated phishing communication may be modified for at least one of the second target language and the second target locale, and the simulated phishing communication with the content modified/contextualized for at least one of the second target language and the second target locale may be communicated to the second user.

In some embodiments, the steps performed by contextualization engine 204, translation engine 206, and/or localization engine 208 in identifying one or more contextual parameters for the user and/or the second user, and modifying the content of the simulated phishing communication or the template for a simulated phishing communication according to the one or more contextual parameters for the user and/or the second user may be performed by security awareness training system 202.

Similar to the user and the second user, one or more contextual parameters for n-number of different users may be identified and the content of the simulated phishing communication may be modified to make the content contextually relevant to the target users, and the simulated phishing communication with the content modified/contextualized may be communicated to the corresponding user.

Figure 3:
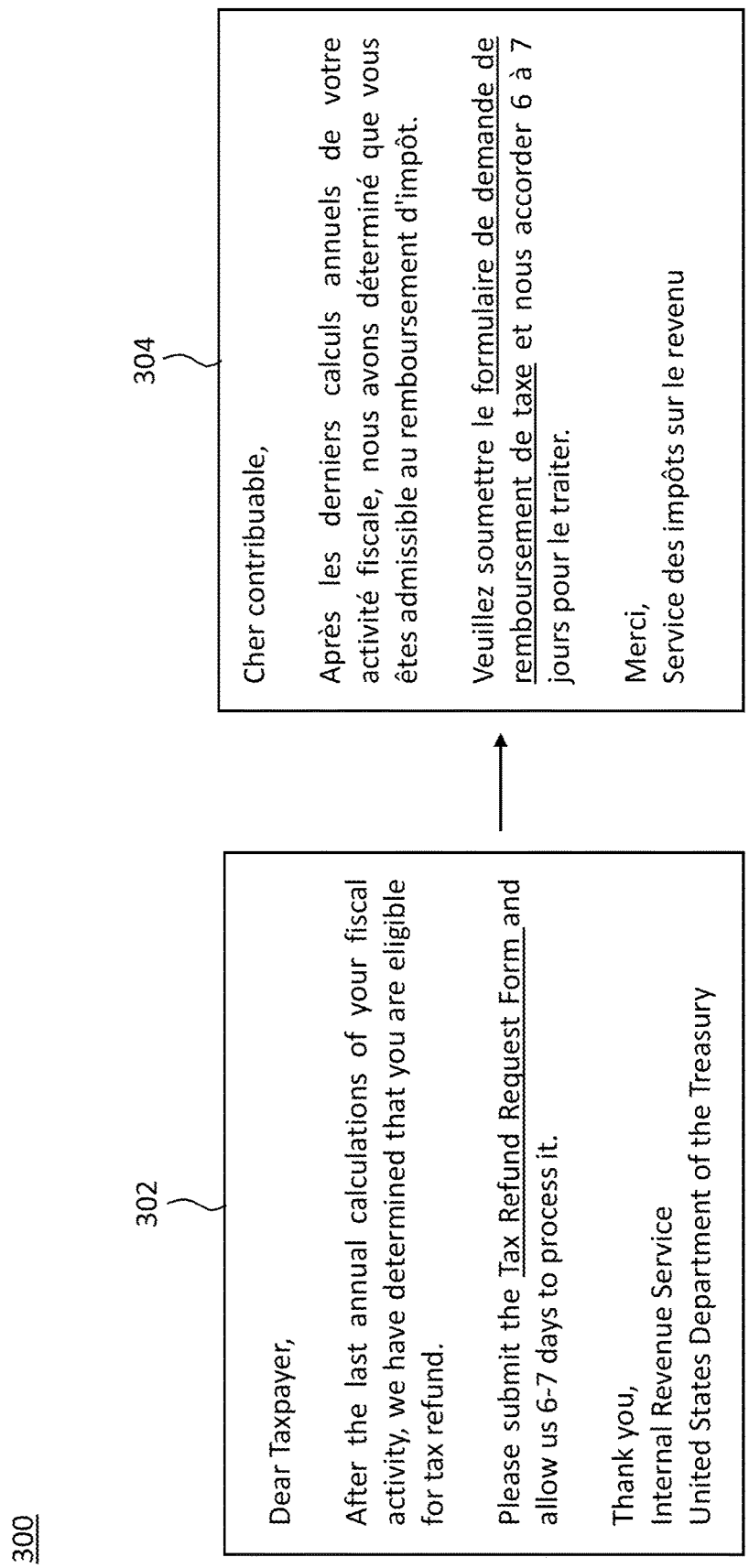
FIG. 3 is an illustration of translation of content of a simulated phishing communication from a source language to a target language, according to some embodiments.

FIG. 3 is an illustration 300 of translation of content of a simulated phishing communication from a source language to a target language, according to some embodiments. FIG. 3 shows template 302 for a simulated phishing communication with content in English. In an example, English may be a default language setting of security awareness training system 202. In some examples, English may be configured or set by the system administrator as a default language. In an example, to make the content of simulated phishing communication highly relevant to a user, translation engine 206 may translate/change the language of the content of the simulated phishing communication to a preferred language or a language spoken by the user. In an example, the user's preferred language or spoken language may be French. Accordingly, translation engine 206 may translate the language of the content of the simulated phishing communication from the source language English to the target language French. In examples, based on the recent browsing history of the user related to queries on tax refund and the location of the user, contextualization engine 204 may provide the context to the content with a tax refund phishing link. Furthermore, the content including "Internal Revenue Service" and "United States Department of the Treasury" is translated and contextualized to suit communication as though appearing from a French tax authority. As a result, contextualized simulated phishing communication 304 is generated. Since the simulated phishing communication is contextualized based on the preferred language or the language spoken by the user, recent browsing history, and the location of the user, the contextualized simulated phishing communication 304 may have a higher likelihood of being relevant to the user, and it is highly likely for the user to trust and interact with the contextualized simulated phishing communication 304. Content of the contextualized simulated phishing communication 304 is a French translation of the English content of simulated phishing communication 302 and is shown for illustration purposes.

Figure 4:
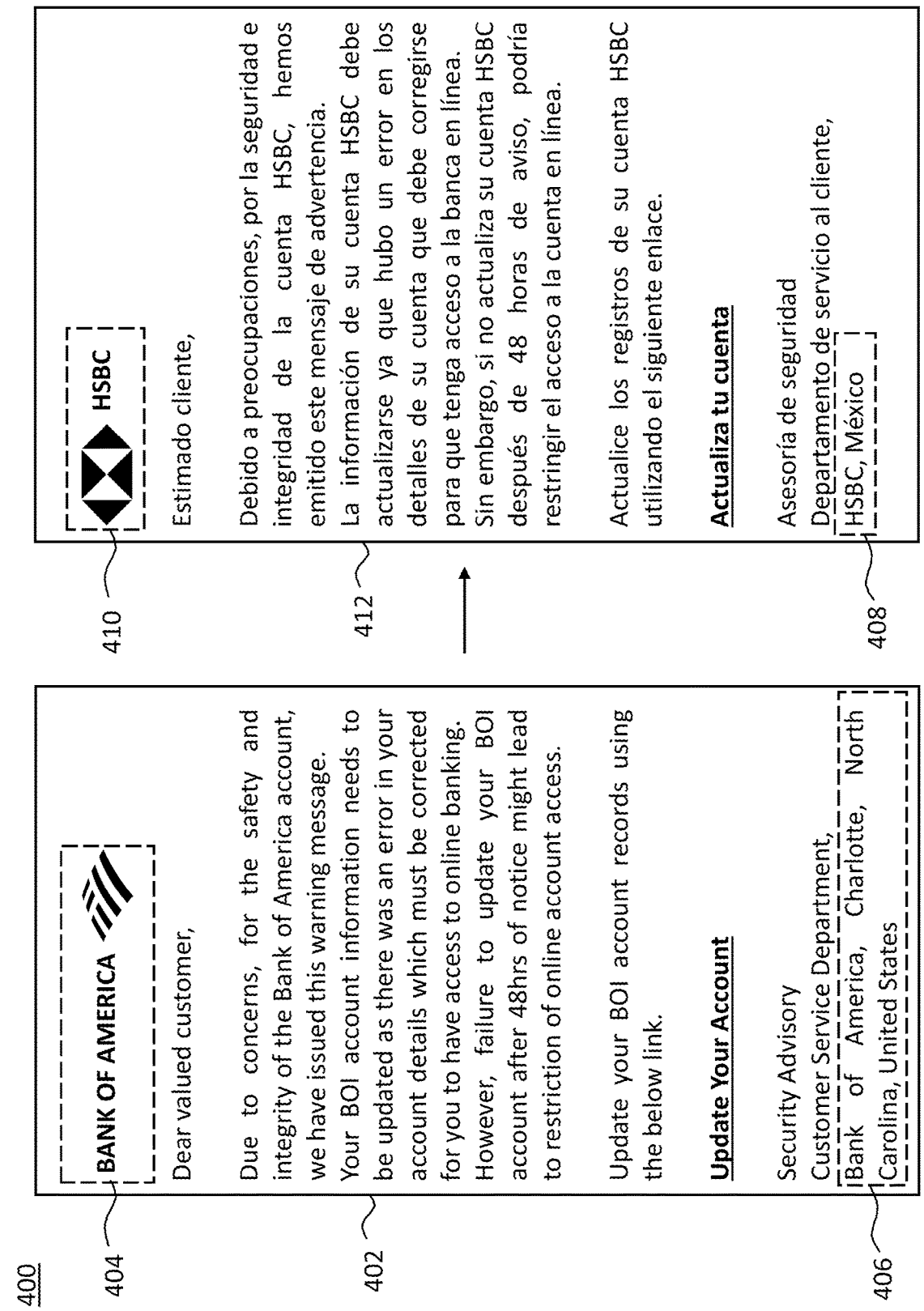
FIG. 4 is an illustration of modification of content of a simulated phishing communication to be appearing from an entity of a target locale instead of an entity of a source locale and modification of a source image in the content of the simulated phishing communication to a target image of the target locale, according to some embodiments.

FIG. 4 is an illustration 400 of modification of content of a simulated phishing communication to appear to be from an entity of a target locale instead of an entity of a source locale and modification of a source image in the content of the simulated phishing communication to a target image of the target locale, according to some embodiments.

FIG. 4 shows template 402 for a simulated phishing communication with content in English. As can be seen in FIG. 4, the content of the simulated phishing communication is related to a communication from a bank to a customer of the bank. In the example of FIG. 4, template 402 includes source image 404. As can be seen in FIG. 4, source image 404 is a logo of a bank—Bank of America®. Template 402 also includes entity 406 of a source locale. In template 402, entity 406 is the bank—Bank of America® located at Charlotte, N.C., United States. In an example, to make the content of the simulated phishing communication highly relevant to a user, translation engine 206 may translate language of the content of the simulated phishing communication to a preferred language or a language spoken by the user. Further, the content of the simulated phishing communication may be changed to appear to be from an entity of the target locale instead of entity 406 of the source locale. In an example, the user may reside in Mexico, may speak Spanish and may have transacted with the HSBC® bank recently. In an implementation, translation engine 206 may translate the language of the content of the simulated phishing communication from English to Spanish. Further, in an implementation, localization engine 208 may change the content of the simulated phishing communication to appear to be from entity 408 of the target locale instead of entity 406 of the source locale. As can be seen in FIG. 4, entity 408 is a bank—HSBC® bank located in Mexico.

Further, source image 404 in the content of the simulated phishing communication is modified to target image 410 of the target locale. As illustrated, target image 410 is a logo of the bank—HSBC® bank. As a result, contextualized simulated phishing communication 412 is generated. Content in contextualized simulated phishing communication 412 is a Spanish translation of the English content of simulated phishing communication 402 and is shown for illustration purposes. Since the simulated phishing communication is contextualized based on the preferred language or the language spoken by the user, the entity of the target locale, the recent context of bank interaction, and the target image of the target locale, contextualized simulated phishing communication 412 may have a higher likelihood of being relevant to the user and it is highly likely for the user to trust and interact with the contextualized simulated phishing communication 412.

Figure 5:
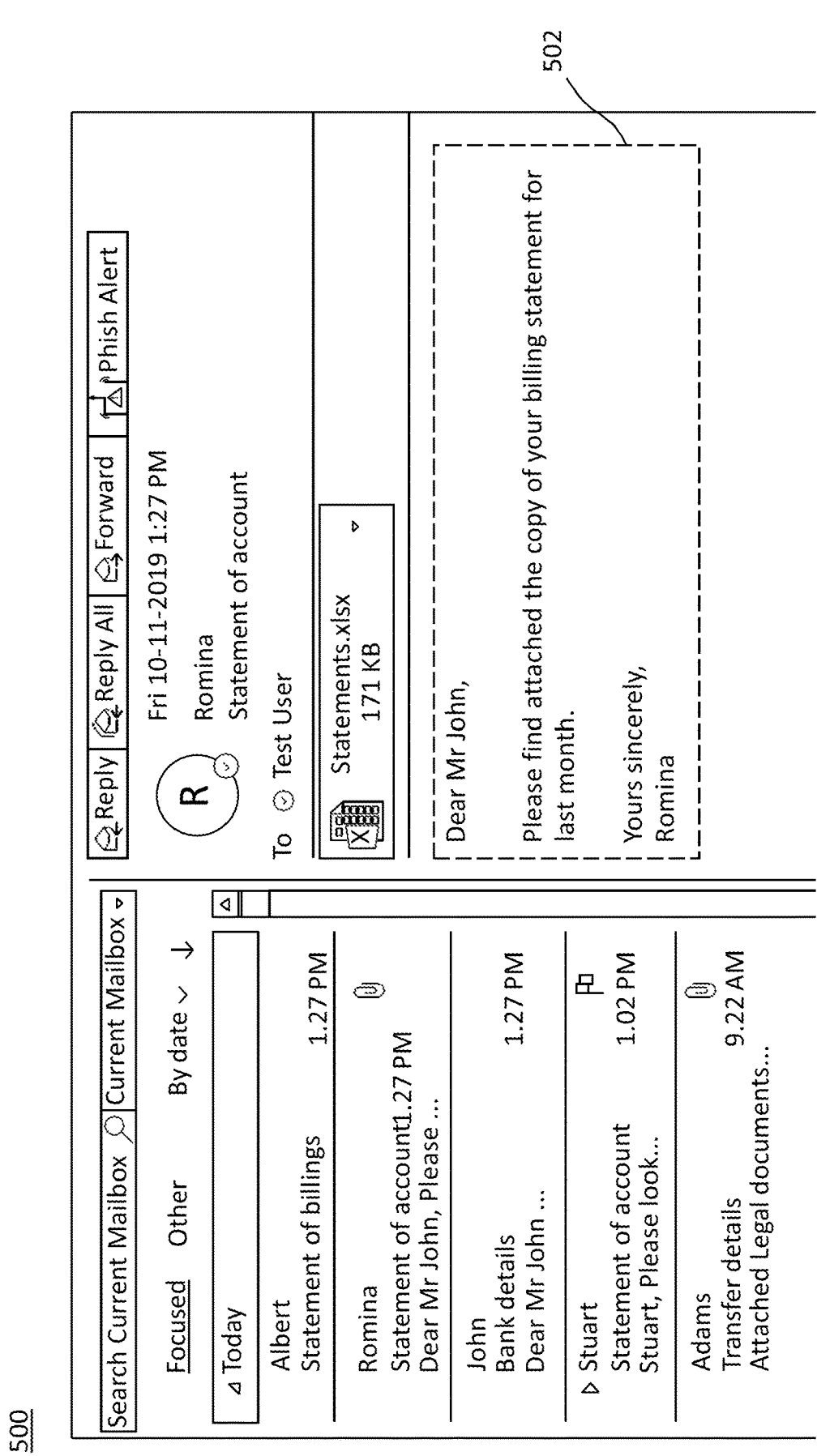
FIG. 5 shows an illustration of a contextualized simulated phishing communication in an email client of a user, according to some embodiments.

FIG. 5 shows an illustration 500 of a contextualized simulated phishing communication in an email client of a user, according to some embodiments.

As can be seen in FIG. 5, a user receives email 502 in an email client. In an implementation, the user may receive email 502 from security awareness training system 202. In the example of FIG. 5, email 502 with subject 'Statement of account' is shown to include a Microsoft® Excel file as an attachment. Email 502 may be a simulated phishing communication that is contextualized based on the user's preferred language, job role/requirement, and time. In an example, the user's preferred language may be British English, job role is accountant, and the time is a typical time for receiving statement of accounts from a particular client. Since email 502 is contextualized based on above contextual parameters, email 502 may have a higher likelihood of being relevant to the user and it is highly likely for the user to trust and interact with email 502.

FIG. 6 shows an illustration 600 of a contextualized simulated phishing communication embedded in webpage 602 being viewed by a user, according to some embodiments.

In an example, a user residing in the United States may be viewing webpage 602. Advertisement 604 may be embedded in webpage 602. In an example, advertisement 604 may be a simulated phishing communication that may be contextualized based on a locale of the user. In an implementation, advertisement 604 may be embedded in webpage 602 by security awareness training system 202. As can be seen in FIG. 6, advertisement 604 appears to be from an entity of the locale of the user. For example, the entity is an investment management company—Merrill® and based on the user's recent searches on investment guidance on the internet. As a result, it is highly likely for the user to trust and interact with advertisement 604.

Figure 7:
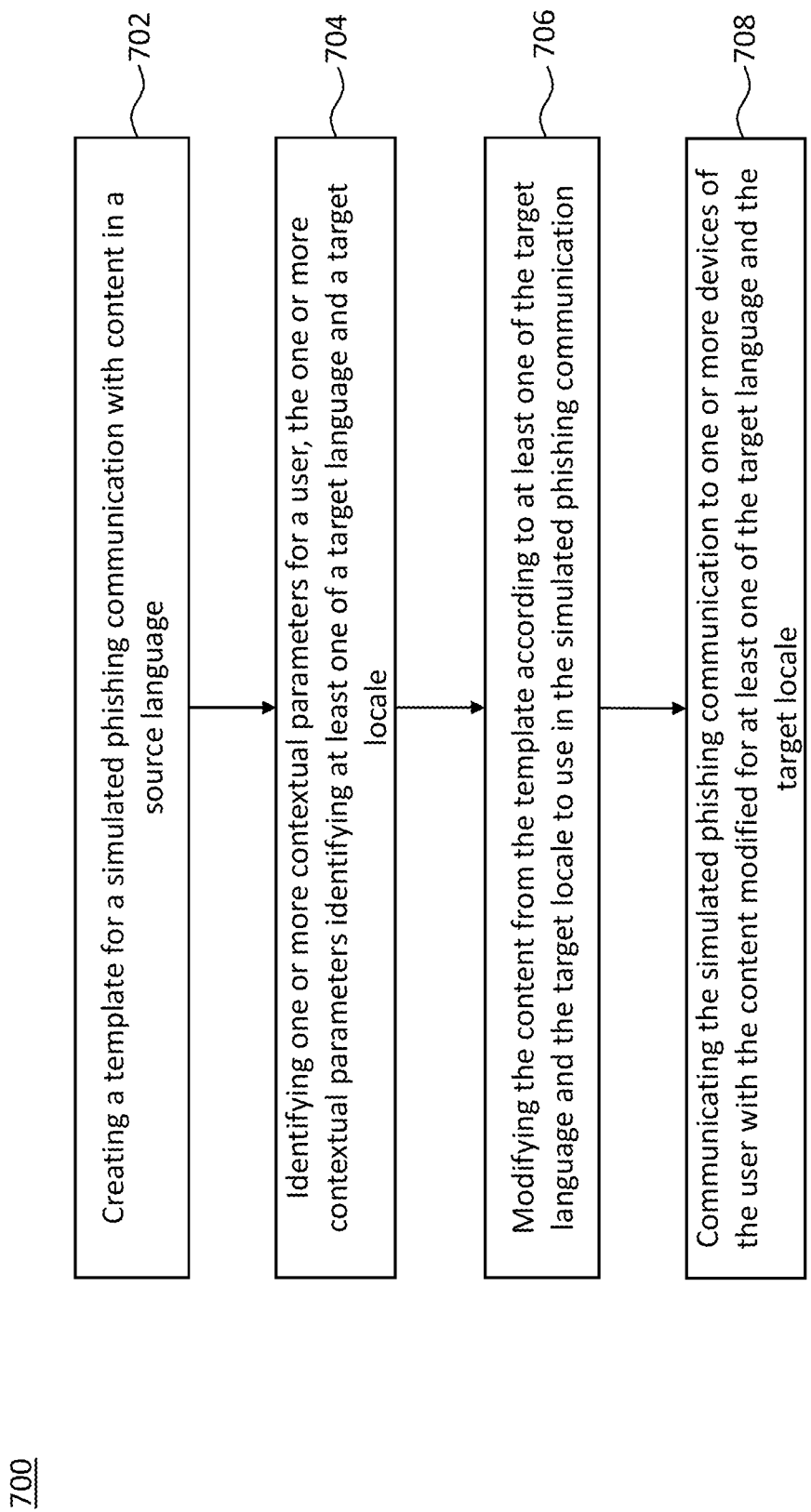
FIG. 7 depicts a flow chart for contextualizing a simulated phishing communication for a user based at least on one of a language and a locale, according to some embodiments.

FIG. 7 depicts a flowchart 700 for contextualizing a simulated phishing communication for a user based at least on one of a language and a locale, according to some embodiments.

Step 702 includes creating a template for a simulated phishing communication with content in a source language. In an implementation, security awareness training system 202 (or a component therein, such as message generator 222) may be configured to create the template for the simulated phishing communication with content in the source language. In an implementation, security awareness training system 202 (or a component therein, such as message generator 222) may be configured to create a simulated phishing communication with content in the source language. In an example, the source language may be a default language of security awareness training system 202. In some examples, the source language may be any language configured or set by the system administrator. For example, the source language may be English or any other known language.

Step 704 includes identifying one or more contextual parameters for a user. The one or more contextual parameters may identify at least one of a target language and a target locale. In an example, the user may be an employee of an organization. In an implementation, contextualization engine 204 may identify the one or more contextual parameters for the user. Contextualization engine 204 may access user record storage 232 of security awareness training system 202 to identify the one or more contextual parameters for the user. In an example, the one or more contextual parameters for the user may include one or more of the following—language spoken by the user, locale of the user, temporal changes (for example, time at which the user changes their locale), job title of the user, job department of the user, religious belief of the user, topic of communication, subject of communication, name of manager or subordinate of the user, industry, address (for example, Zip Code™ and street), name or nickname of the user, subscriptions, preferences, regional currency and units, and any other information associated with the user. In an example, the target language may refer to a language into which the content of the simulated phishing communication is to be translated. In an example, the target language may be any language that is relevant to the user. For example, the target language may be a preferred language of the user or a language spoken by the user. Further, the target locale may refer to locale (or geographical location) of the user. For example, the target locale may refer to a city, a country, a state, a ZIP Code™, a county, and/or a province of the user.

Step 706 includes modifying the content of the simulated phishing communication from the template according to at least one of the target language and the target locale to use in the simulated phishing communication. In an implementation, translation engine 206 may retrieve the template for the simulated phishing communication from simulated phishing communication template storage 230 of security awareness training system 202 and translate the content of the simulated phishing communication from the source language to the target language. In an implementation, contextualization engine 204 may modify the content of the simulated phishing communication based on an input received from the user on user's preference for one of the target language or the target locale. In some implementations, contextualization engine 204 may modify tagged content in the content of the simulated phishing communication for one of the target locale or the target language.

In some implementations, localization engine 208 may change the content of the simulated phishing communication to appear to be from an entity of the target locale instead of an entity of a source locale. Further, in some implementations, localization engine 208 may modify the source image in the content of the simulated phishing communication to a target image of the target locale. In some implementations, localization engine 208 may modify location related content in the content of the simulated phishing communication to include location related content for the target locale.

Step 708 includes communicating the simulated phishing communication to one or more devices of the user with the content modified for at least one of the target language and the target locale. According to an implementation, security awareness training system 202 may receive the contextualized/modified template for the simulated phishing communication. On receiving the contextualized/modified template for the simulated phishing communication, security awareness training system 202 may communicate the simulated phishing communication to one or more devices of the user with the content modified for at least one of the target language and the target locale. In an implementation, security awareness training system 202 may detect an interaction with the simulated phishing communication by the user. Further, security awareness training system 202 may identify electronic training for the user based at least on the detection. In an implementation, security awareness training system 202 may modify the content of the electronic training according to one of the target language or the target locale before communicating the electronic training to the user.

Figure 8:
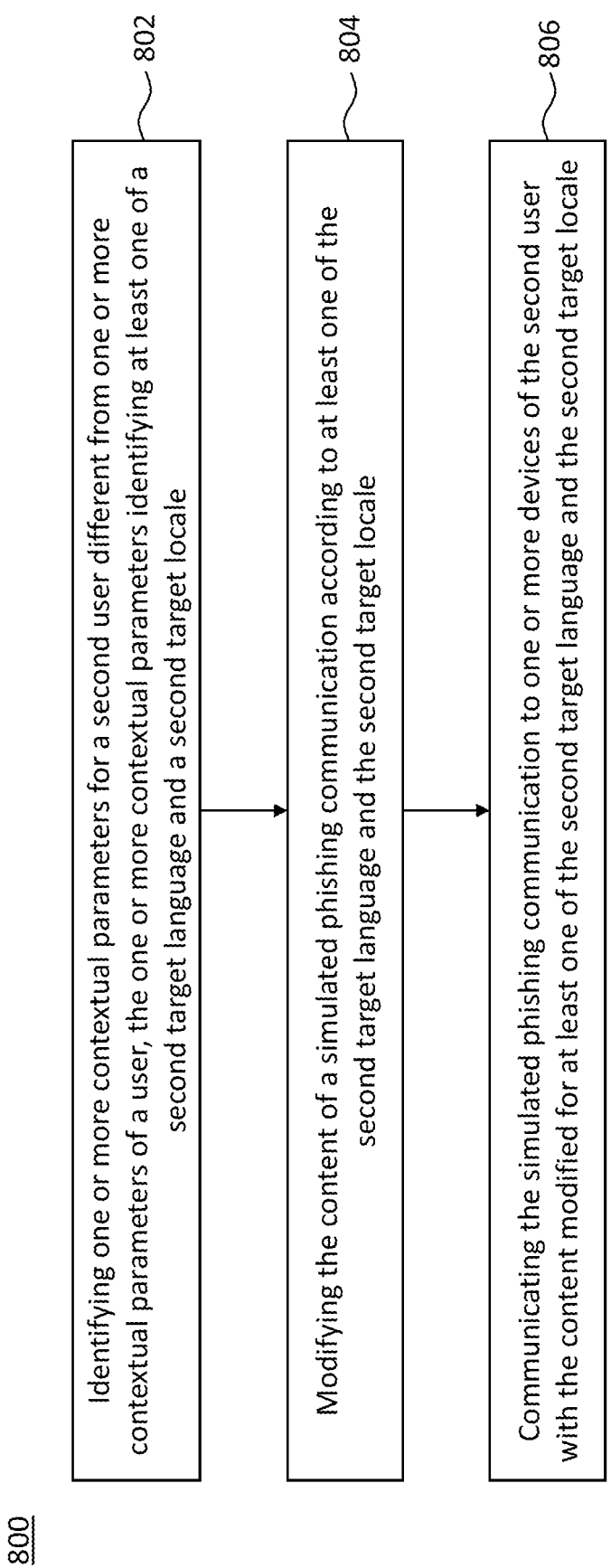
FIG. 8 depicts a flow chart for contextualizing a simulated phishing communication for a second user based at least on one of a language and a locale, according to some embodiments.

FIG. 8 depicts a flowchart 800 for contextualizing a simulated phishing communication for a second user based at least on one of a language and a locale, according to some embodiments.

Step 802 includes identifying one or more contextual parameters for a second user different from one or more contextual parameters of a user. The one or more contextual parameters may identify at least one of a second target language and a second target locale. In an implementation, contextualization engine 204 may identify the one or more contextual parameters for the second user. Contextualization engine 204 may access user record storage 232 of security awareness training system 202 to identify the one or more contextual parameters for the second user. In an example, the one or more contextual parameters for the second user may include one or more of the following—language spoken by the second user, locale of the second user, temporal changes (for example, time at which the second user changes their locale), job title of the second user, job department of the second user, religious beliefs of the second user, topic of communication, subject of communication, name of manager or subordinate of the second user, industry, address (for example, Zip Code™ and street), name or nickname of the second user, subscriptions, preferences, recent browsing history, transaction history, recent communications with peers/manager/human resource partners/banking partners, regional currency and units, and any other information associated with the second user.

Step 804 includes modifying the content of a simulated phishing communication according to at least one of the second target language and the second target locale. In an implementation, contextualization engine 204 may retrieve the template for the simulated phishing communication from simulated phishing communication template storage 230 of security awareness training system 202. In an implementation, translation engine 206 may translate the content of the simulated phishing communication from the source language to the second target language. In some implementations, contextualization engine 204 may modify the content of the simulated phishing communication or the template for a simulated phishing communication according to at least one of the second target language and the second target locale.

Step 806 includes communicating the simulated phishing communication to one or more devices of the second user with the content modified for at least one of the second target language and the second target locale. According to an implementation, security awareness training system 202 may receive the contextualized/modified template for the simulated phishing communication. On receiving the contextualized/modified template for the simulated phishing communication, security awareness training system 202 may communicate the simulated phishing communication to one or more devices of the second user with the content modified for at least one of the second target language and the second target locale.

The present disclosure reduces the burden of the system administrator to create simulated phishing campaigns. The present disclosure provides support to the system administrator by providing security awareness training system 202, contextualization engine 204, translation engine 206, and localization engine 208 in creating multiple simulated phishing campaigns that are translated, localized and customized to each user of the organization. The system administrator may create one template, security awareness training system 202, contextualization engine 204, translation engine 206, and localization engine 208 may use the template to create multiple simulated phishing campaigns by translating, localizing and customizing the template to make it highly relevant to each of the users of the organization.

Although the present disclosure is described with respect to employees of the organization, the present disclosure may be applicable to users or customers of social media platforms, banks, retail stores, online marketplaces, online service providers and any other individuals who have online accounts with entities. The users or customers are likely to encounter phishing attacks and embodiments of the application are applicable for the above examples. Other example implementations of the embodiments in and outside the organization that are not described herein are contemplated herein.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for contextualizing a simulated phishing communication based at least on one of language and locale, the method comprising:
   (a) creating, by one or more processors, a template for a simulated phishing communication with content in a source language;
   (b) identifying, by the one or more processors, one or more contextual parameters for a user, the one or more contextual parameters identifying at least one of a target language and a target locale;
   (c) modifying, by the one or more processors responsive to the one or more contextual parameters, the content in the source language of the template created for the simulated phishing communication according to at least one of the target language and the target locale to use in the simulated phishing communication; and
   (d) communicating, by the one or more processors, the simulated phishing communication to one or more devices of the user with the content modified for at least one of the target language and the target locale.

2. The method of claim 1, further comprising identifying, by the one or more processors, one or more contextual parameters of a second user different from the one or more contextual parameters of the user, the one or more contextual parameters of the second user identifying at least one of a second target language and a second target locale.

3. The method of claim 2, further comprising modifying, by the one or more processors responsive to the one or more contextual parameters of the second user, the content in the template or the simulated phishing communication for at least one of the second target language and the second target locale.

4. The method of claim 1, wherein the one or more contextual parameters identify one or more of the following; job title, job department, religious belief, topic of communication, subject of communication, industry, address, name or nickname of user, and regional currency and units.

5. The method of claim 1, wherein (c) further comprises translating, by the one or more processors, the content in the template or the simulated phishing communication from the source language to the target language.

6. The method of claim 1, wherein (c) further comprises changing, by the one or more processors, the content in the template or the simulated phishing communication to appear to be from an entity of the target locale instead of an entity of a source locale.

7. The method of claim 6, further comprising modifying a source image in the content in the template or the simulated phishing communication to a target image of the target locale.

8. The method of claim 1, wherein (c) further comprises modifying, by the one or more processors, location related content in the content in the template or the simulated phishing communication to comprise location related content for the target locale.

9. The method of claim 1, wherein (c) further comprises modifying, by the one or more processors, tagged content in the content in the template or the simulated phishing communication to be modified for one of the target locale or the target language.

10. The method of claim 1, further comprising receiving, by the one or more processors, an input from the user on user's preference for one of the target language or the target locale.

11. The method of claim 1, further comprising detecting, by the one or more processors, an interaction with the simulated phishing communication by the user.

12. The method of claim 11, further comprising identifying, by the one or more processors, electronic training for the user based at least on the detection.

13. The method of claim 12, further comprising modifying, by the one or more processors responsive to the one or more contextual parameters, content of the electronic training according to one of the target language or the target locale and communicating, by the one or more processors, the electronic training to the user.

14. A system for contextualizing a simulated phishing communication based at least on one of language and locale, the system comprising:
   one or more processors, coupled to memory and configured to:
      create a template for a simulated phishing communication with content in a source language;
      identify one or more contextual parameters for a user, wherein the one or more contextual parameters identifying at least one of a target language and a target locale;
      modify, responsive to the one or more contextual parameters, the content in the source language of the template created for the simulated phishing communication according to at least one of the target language and the target locale to use in the simulated phishing communication; and
      communicate the simulated phishing communication to one or more devices of the user with the content modified for at least one of the target language and the target locale.

15. The system of claim 14, wherein the one or more processors are further configured to identify one or more contextual parameters of a second user different from the one or more contextual parameters of the user, the one or more contextual parameters of the second user identifying at least one of a second target language and a second target locale.

16. The system of claim 15, wherein the one or more processors are further configured to modify, responsive to the one or more contextual parameters of the second user, the content in the template or the simulated phishing communication for at least one of the second target language and the second target locale.

17. The system of claim 14, wherein the one or more contextual parameters identify one or more of the following; job title, job department, religious belief, topic of communication, subject of communication, industry, address, name or nickname of user, and regional currency and units.

18. The system of claim 14, wherein the one or more processors are further configured to translate the content in the template or the simulated phishing communication from the source language to the target language.

19. The system of claim 14, wherein the one or more processors are further configured to change the in the template or of the simulated phishing communication to appear to be from an entity of the target locale instead of an entity of a source locale.

20. The system of claim 19, wherein the one or more processors are further configured to modify a source image in the content in the template or the simulated phishing communication to a target image of the target locale.

21. The system of claim 14, wherein the one or more processors are further configured to modify location related content in the content in the template or the simulated phishing communication to comprise location related content for the target locale.

22. The system of claim 14, wherein the one or more processors are further configured to modify tagged content in the content in the template or the simulated phishing communication to be modified for one of the target locale or the target language.

23. The system of claim 14, wherein the one or more processors are further configured to receive an input from the user on user's preference for one of the target language or the target locale.

24. The system of claim 14, wherein the one or more processors are further configured to detect an interaction with the simulated phishing communication by the user.

25. The system of claim 24, wherein the one or more processors are further configured to identify electronic training for the user based at least on the detection.

26. The system of claim 25, wherein the one or more processors are further configured to modify, responsive to the one or more contextual parameters, content of the electronic training according to one of the target language or the target locale and communicating, by the one or more processors, the electronic training to the user.

* * * * *